US012573128B2

(12) United States Patent
Burns et al.

(10) Patent No.: US 12,573,128 B2
(45) Date of Patent: Mar. 10, 2026

(54) PROGRESSIVE COMPRESSION OF GEOMETRY FOR GRAPHICS PROCESSING

(71) Applicant: Apple Inc., Cupertino, CA (US)

(72) Inventors: Christopher A. Burns, Austin, TX (US); Fergus W. MacGarry, Cambridge (GB); Luca O. Iuliano, Milton Keynes (GB); Ali Rabbani Rankouhi, Bushey (GB); Richard W. Schreyer, Scotts Valley, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/971,621

(22) Filed: Dec. 6, 2024

(65) Prior Publication Data

US 2025/0371792 A1      Dec. 4, 2025

Related U.S. Application Data

(60) Provisional application No. 63/655,333, filed on Jun. 3, 2024.

(51) Int. Cl.
*G06T 15/06* (2011.01)
*G06T 1/60* (2006.01)
(Continued)

(52) U.S. Cl.
CPC .............. *G06T 15/06* (2013.01); *G06T 1/60* (2013.01); *G06T 9/00* (2013.01); *G06T 15/005* (2013.01);
(Continued)

(58) Field of Classification Search
None
See application file for complete search history.

(56) References Cited

U.S. PATENT DOCUMENTS

| 2017/0019669 A1* | 1/2017 | Heo ...................... H04N 19/61 |
| 2020/0320776 A1 | 10/2020 | Doyle et al. |

(Continued)

OTHER PUBLICATIONS

International Search Report and Written Opinion in PCT Appl. No. PCT/US2025/026482 mailed Aug. 14, 2025, 9 pages.

*Primary Examiner* — Sarah Le

(74) *Attorney, Agent, or Firm* — Kowert, Hood, Munyon, Rankin & Goetzel, P.C.; Michael B. Davis; Dean M. Munyon

(57) ABSTRACT

A graphics processor includes circuitry configured to generate a bounding volume hierarchy (BVH) data structure for a graphics scene to be rendered. The BVH includes a leaf node that includes: node data that specifies quantization frame data for quantized primitive children of the leaf node, a quantized primitive block that includes quantized vertex components of the primitive children, and a vertex residual block that includes additional vertex data for the primitive children. The vertex residual block may not include redundant data with the quantized primitive block and the quantized primitive block and vertex residual block may include, for the primitive children, sufficient data to reconstruct an original-precision representation of their vertices. The circuitry may traverse the BVH to perform ray tracing operations during render of the graphics scene, including to perform one or more ray primitive intersect tests based on the quantized primitive block and the vertex residual block.

20 Claims, 16 Drawing Sheets

(51) Int. Cl.
  *G06T 9/00*       (2006.01)
  *G06T 15/00*     (2011.01)

(52) U.S. Cl.
  CPC ...... *G06T 2210/12* (2013.01); *G06T 2210/21*
                                    (2013.01)

(56)              References Cited

U.S. PATENT DOCUMENTS

| 2021/0287428 A1 | 9/2021 | Woop et al. | |
| 2021/0304484 A1* | 9/2021 | Saleh | G06T 15/005 |
| 2022/0207690 A1 | 6/2022 | Burns et al. | |
| 2023/0102071 A1 | 3/2023 | Burns | |
| 2023/0206541 A1 | 6/2023 | Saleh et al. | |
| 2025/0209723 A1* | 6/2025 | Kensler | G06T 15/06 |
| 2025/0308128 A1* | 10/2025 | Drabinski | G06T 15/06 |

* cited by examiner

*Example encoding of triangle data in a BVH node*

*Example information in node data relating to triangles*

| Quantization frame scale factors 410 | Quantization frame origin 420 | Number of triangles, number of MBs, triangles per MB 430 | VRB size per MB 440 | Size of optional attributes 450 |
|---|---|---|---|---|

*FIG. 4*

*Example QTB encoding*

| Bit count per component 510 | Triangle B vertex indices 520B | ⋯ | Triangle N vertex indices 520N | Quantized data for a vertex 530A | | Quantized data for a vertex 530M |
|---|---|---|---|---|---|---|

*Fixed-size*
*(e.g., corresponding to a cache line)*

*FIG. 5*

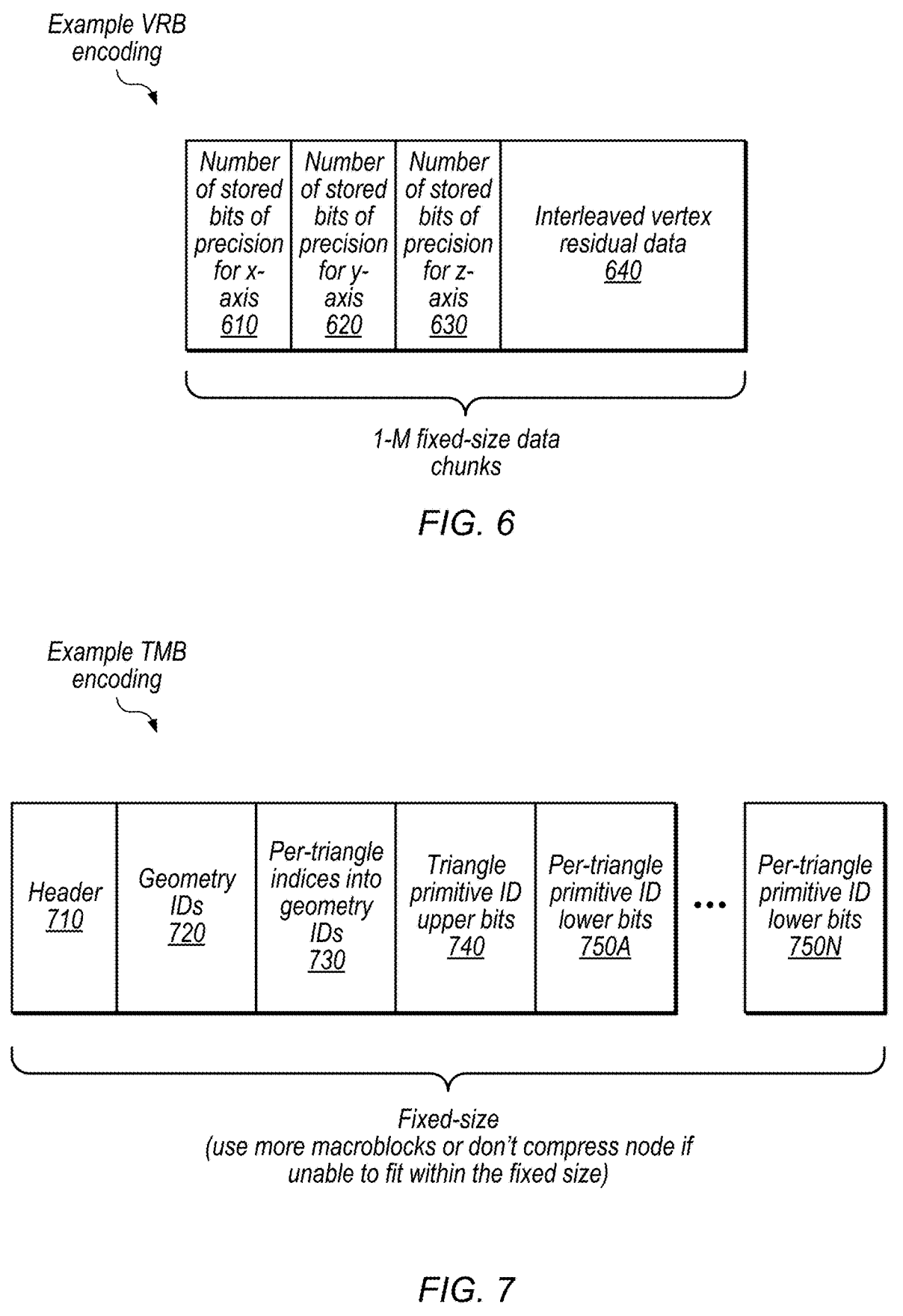

*Example VRB encoding*

| Number of stored bits of precision for x-axis 610 | Number of stored bits of precision for y-axis 620 | Number of stored bits of precision for z-axis 630 | Interleaved vertex residual data 640 |
|---|---|---|---|

1-M fixed-size data chunks

*FIG. 6*

*Example TMB encoding*

| Header 710 | Geometry IDs 720 | Per-triangle indices into geometry IDs 730 | Triangle primitive ID upper bits 740 | Per-triangle primitive ID lower bits 750A | ... | Per-triangle primitive ID lower bits 750N |
|---|---|---|---|---|---|---|

Fixed-size
(use more macroblocks or don't compress node if unable to fit within the fixed size)

*FIG. 7*

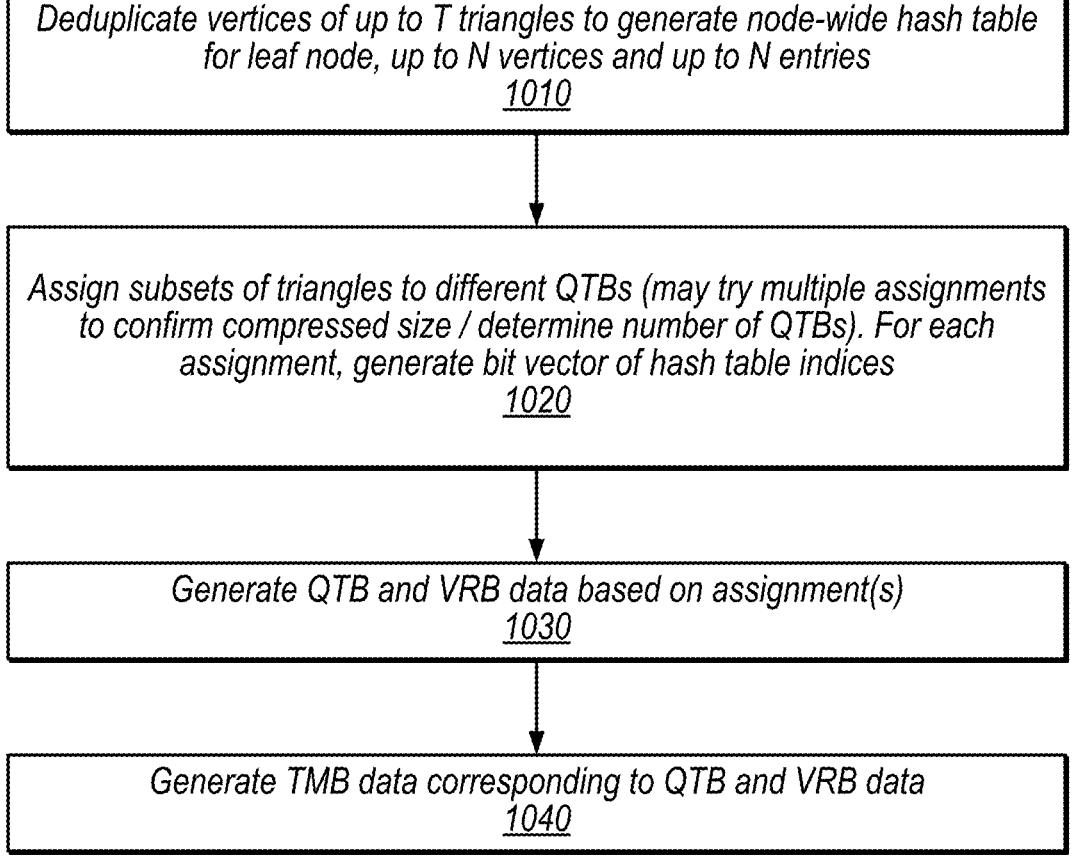

Deduplicate vertices of up to T triangles to generate node-wide hash table
for leaf node, up to N vertices and up to N entries
1010

Assign subsets of triangles to different QTBs (may try multiple assignments
to confirm compressed size / determine number of QTBs). For each
assignment, generate bit vector of hash table indices
1020

Generate QTB and VRB data based on assignment(s)
1030

Generate TMB data corresponding to QTB and VRB data
1040

FIG. 10

*Example data for*
*triangle A*

| Vertex | Index in node-wide hash table |
|--------|-------------------------------|
| 0      | 0                             |
| 1      | 1                             |
| 2      | 2                             |

*Example data for*
*triangle B*

| Vertex | Index in node-wide hash table |
|--------|-------------------------------|
| 0      | 7                             |
| 1      | 2                             |
| 2      | 1                             |

*Example output bit vector for*
*triangles A and B (e.g., output of*
*element 1040 of Fig. 11)*

| 1 | 1 | 1 | 0 | 0 | 0 | 0 | 1 |  ...

*Number of unique vertices for*
*triangles A and B = 4 (sum of set*
*bits in output bit vector)*

Figure 13:
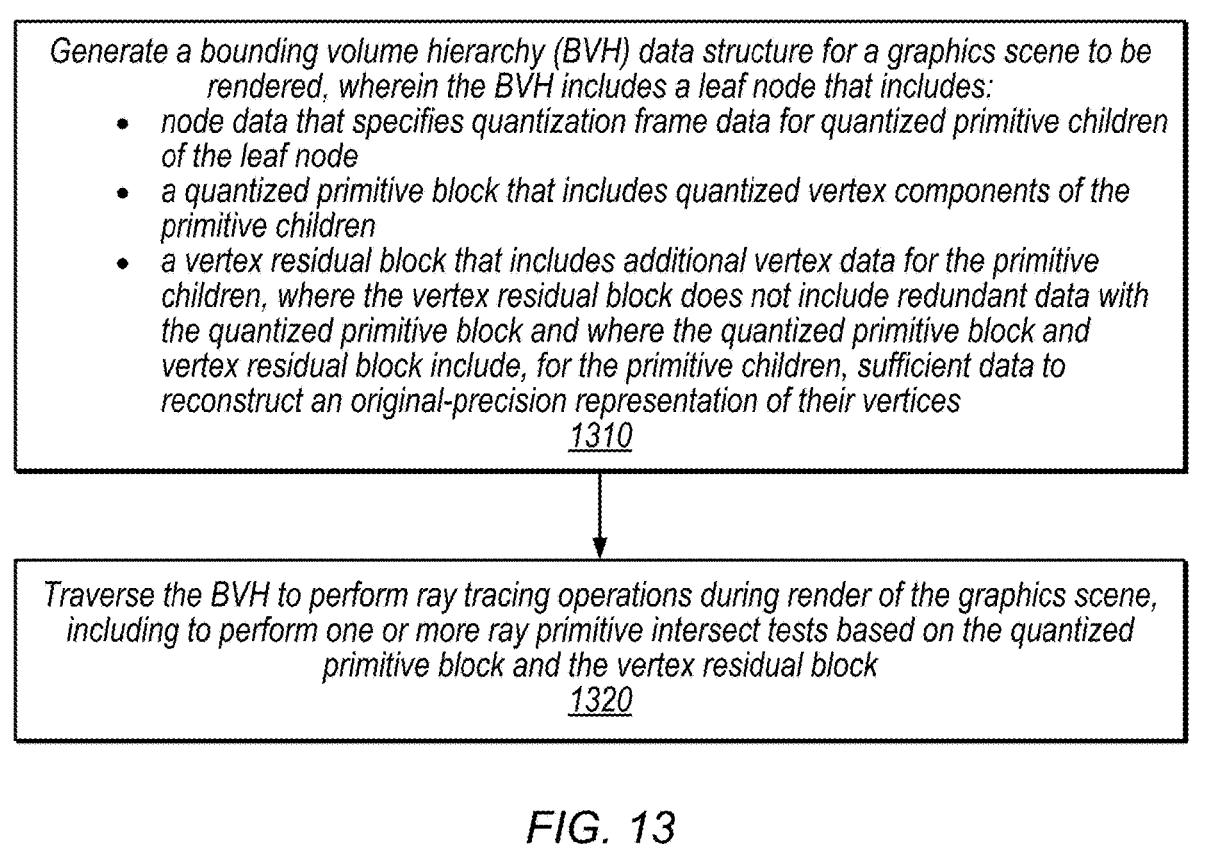

*Generate a bounding volume hierarchy (BVH) data structure for a graphics scene to be rendered, wherein the BVH includes a leaf node that includes:*

- *node data that specifies quantization frame data for quantized primitive children of the leaf node*
- *a quantized primitive block that includes quantized vertex components of the primitive children*
- *a vertex residual block that includes additional vertex data for the primitive children, where the vertex residual block does not include redundant data with the quantized primitive block and where the quantized primitive block and vertex residual block include, for the primitive children, sufficient data to reconstruct an original-precision representation of their vertices*

*1310*

*Traverse the BVH to perform ray tracing operations during render of the graphics scene, including to perform one or more ray primitive intersect tests based on the quantized primitive block and the vertex residual block*

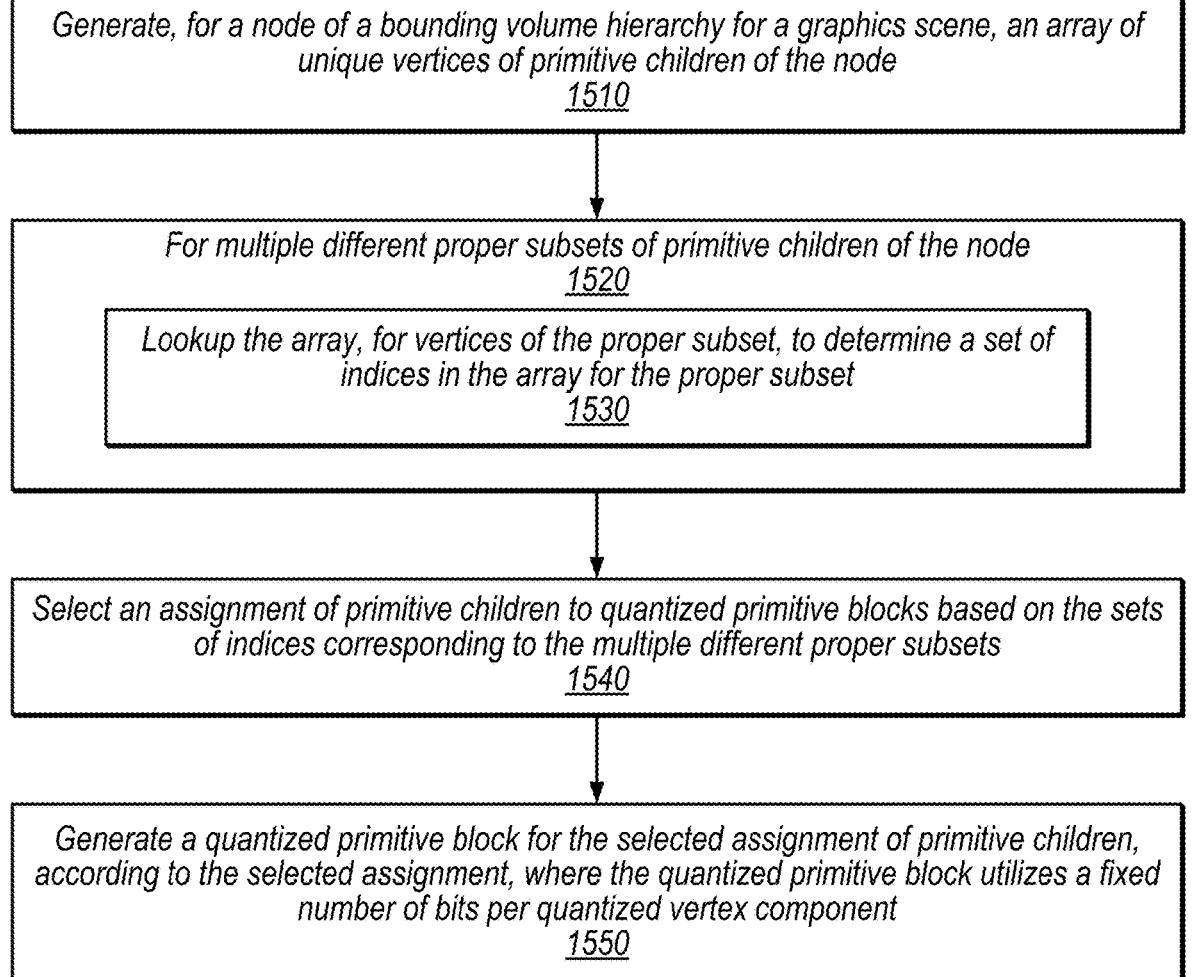

Generate, for a node of a bounding volume hierarchy for a graphics scene, an array of unique vertices of primitive children of the node
1510

For multiple different proper subsets of primitive children of the node
1520

Lookup the array, for vertices of the proper subset, to determine a set of indices in the array for the proper subset
1530

Select an assignment of primitive children to quantized primitive blocks based on the sets of indices corresponding to the multiple different proper subsets
1540

Generate a quantized primitive block for the selected assignment of primitive children, according to the selected assignment, where the quantized primitive block utilizes a fixed number of bits per quantized vertex component
1550

FIG. 15

PROGRESSIVE COMPRESSION OF GEOMETRY FOR GRAPHICS PROCESSING

CROSS REFERENCE TO RELATED APPLICATIONS

The present application claims priority to U.S. Provisional App. No. 63/655,333, entitled "Progressive Compression of Geometry for Graphics Processing," filed Jun. 3, 2024, the disclosure of which is incorporated by reference herein in its entirety.

BACKGROUND

Technical Field

This disclosure relates generally to graphics processors and more particularly to compression for geometry data, such as triangle data for ray tracing.

Description of Related Art

Ray tracing in graphics processors typically utilizes acceleration data structures (ADSs) such as bounding volume hierarchies (BVHs) to improve performance when determining which rays to test for intersection with which primitives (e.g., triangles) in a graphics scene. Encoding child primitive data in the BVH may substantially contribute to BVH size, however, particularly when primitive data may be utilized at multiple precisions (e.g., an original precision and a quantized precision).

BRIEF DESCRIPTION OF DRAWINGS

FIG. 4 is a diagram illustrating an example encoding of the node data portion of the node encoding, according to some embodiments.

FIG. 5 is a diagram illustrating an example encoding of the quantized triangle block portion of the node encoding, according to some embodiments.

FIG. 6 is a diagram illustrating an example encoding of the vertex residual block portion of the node encoding, according to some embodiments.

FIG. 7 is a diagram illustrating an example encoding of the triangle metadata block portion of the node encoding, according to some embodiments.

FIG. 10 is a flow diagram illustrating an example method for deduplicating vertices to generate QTB data, according to some embodiments.

FIGS. 13-15 are flow diagrams illustrating example methods, according to some embodiments.

DETAILED DESCRIPTION

Ray tracing in graphics processing typically utilizes hardware acceleration to perform traversal operations within a bounding volume (BVH) hierarchy. The traversal may determine which primitives (e.g., triangles) in a graphics scene should be tested to determine if they are intersected by a given ray. Tests for bounding boxes of the BVH hierarchy may operate on quantized bounding box coordinates, but the ray/triangle intersection tests at leaf nodes have traditionally been performed at full precision.

In some embodiments, a lower-precision triangle filter is used to eliminate certain full-precision triangle tests. For example, the following two patent applications describe techniques for skipping full-precision triangle tests when the filter test determines that there is not a hit (and in some cases, when the filter test definitely determines that there is a hit without needing a full-precision test): U.S. patent application Ser. No. 17/136,542, filed Dec. 29, 2020 and titled "Primitive Testing for Ray Intersection at Multiple Precisions" and Ser. No. 17/456,483, filed Nov. 24, 2021 and titled "Ray Intersection Testing with Quantization and Interval Representations."

While triangle filters may reduce power consumption, improve performance, or both (at least for certain workloads), storing both compressed and uncompressed triangle data may increase the size of the BVH. It may be undesirable to compress/de-compress triangle data multiple times, however or to access triangle data from another location outside of the BVH.

Therefore, in disclosed embodiments, a progressive geometry compression scheme is utilized in which quantized triangle data (e.g., usable by the triangle filter) is stored in quantized blocks while separate blocks store the residual precision that was not incorporated into the quantized blocks. This may advantageously reduce BVH footprint and traversal-time bandwidth without traversal performance penalties.

In some specific embodiments, a BVH node includes node data used by box test hardware, quantized triangle block (QTB) data used by triangle filter hardware, vertex residual block (VRB) data used for higher-precision triangle tests, and other data usable by shader programs (e.g., a triangle metadata block (TMB) and optional attributes).

The present disclosure also sets out deduplication techniques, e.g., to determine assignment of primitives to quantized triangle blocks, based on unique vertices of primitive children of the node, in an efficient manner.

Graphics Processing Overview

Figure 1A:
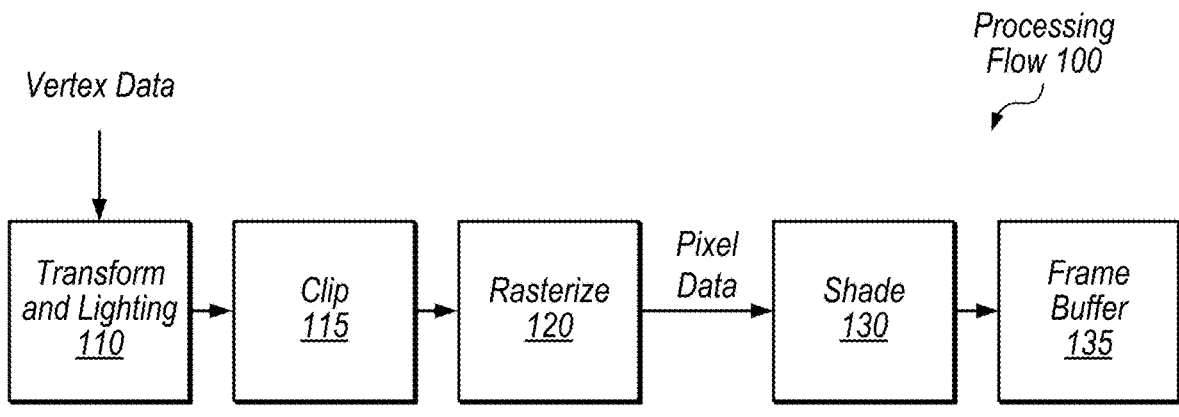
FIG. 1A is a diagram illustrating an overview of example graphics processing operations, according to some embodiments.

Referring to FIG. 1A, a flow diagram illustrating an example processing flow 100 for processing graphics data is shown. In some embodiments, transform and lighting procedure 110 may involve processing lighting information for vertices received from an application based on defined light source locations, reflectance, etc., assembling the vertices into polygons (e.g., triangles), and transforming the polygons to the correct size and orientation based on position in a three-dimensional space. Clip procedure 115 may involve discarding polygons or vertices that fall outside of a viewable area. In some embodiments, geometry processing may utilize object shaders and mesh shaders for flexibility and efficient processing prior to rasterization. Rasterize procedure 120 may involve defining fragments within each polygon and assigning initial color values for each fragment, e.g., based on texture coordinates of the vertices of the polygon. Fragments may specify attributes for pixels which they overlap, but the actual pixel attributes may be determined based on combining multiple fragments (e.g., in a frame buffer), ignoring one or more fragments (e.g., if they are covered by other objects), or both. Shade procedure 130 may involve altering pixel components based on lighting, shadows, bump mapping, translucency, etc. Shaded pixels may be assembled in a frame buffer 135. Modern GPUs typically include programmable shaders that allow customization of shading and other processing procedures by application developers. Thus, in various embodiments, the example elements of FIG. 1A may be performed in various orders, performed in parallel, or omitted. Additional processing procedures may also be implemented.

Figure 1B:
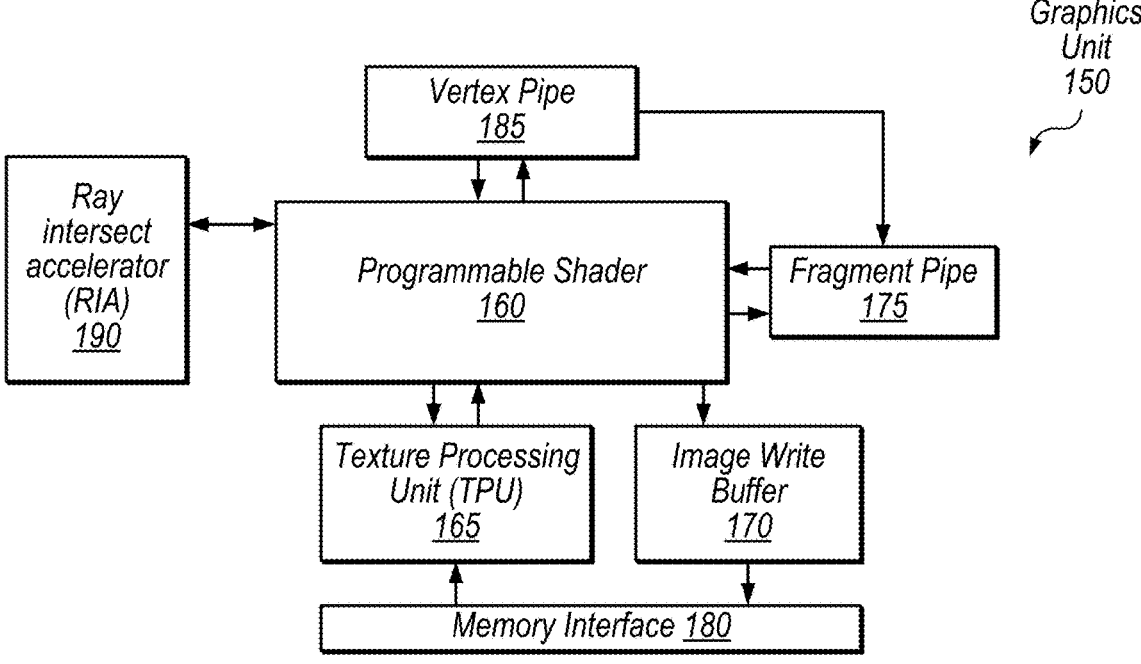
FIG. 1B is a block diagram illustrating an example graphics unit, according to some embodiments.

Referring now to FIG. 1B, a simplified block diagram illustrating a graphics unit 150 is shown, according to some embodiments. In the illustrated embodiment, graphics unit 150 includes programmable shader 160, vertex pipe 185, fragment pipe 175, texture processing unit (TPU) 165, image write buffer 170, and memory interface 180. In some embodiments, graphics unit 150 is configured to process both vertex and fragment data using programmable shader 160, which may be configured to process graphics data in parallel using multiple execution pipelines or instances.

Vertex pipe 185, in the illustrated embodiment, may include various fixed-function hardware configured to process vertex data. Vertex pipe 185 may be configured to communicate with programmable shader 160 in order to coordinate vertex processing. In the illustrated embodiment, vertex pipe 185 is configured to send processed data to fragment pipe 175 or programmable shader 160 for further processing.

Fragment pipe 175, in the illustrated embodiment, may include various fixed-function hardware configured to process pixel data. Fragment pipe 175 may be configured to communicate with programmable shader 160 in order to coordinate fragment processing. Fragment pipe 175 may be configured to perform rasterization on polygons from vertex pipe 185 or programmable shader 160 to generate fragment data. Vertex pipe 185 and fragment pipe 175 may be coupled to memory interface 180 (coupling not shown) in order to access graphics data.

Programmable shader 160, in the illustrated embodiment, is configured to receive vertex data from vertex pipe 185 and fragment data from fragment pipe 175 and TPU 165. Programmable shader 160 may be configured to perform vertex processing tasks on vertex data which may include various transformations and adjustments of vertex data. Programmable shader 160, in the illustrated embodiment, is also configured to perform fragment processing tasks on pixel data such as texturing and shading, for example. Programmable shader 160 may include multiple sets of multiple execution pipelines for processing data in parallel.

In some embodiments, programmable shader includes pipelines configured to execute one or more different SIMD groups in parallel. Each pipeline may include various stages configured to perform operations in a given clock cycle, such as fetch, decode, issue, execute, etc. The concept of a processor "pipeline" is well understood, and refers to the concept of splitting the "work" a processor performs on instructions into multiple stages. In some embodiments, instruction decode, dispatch, execution (i.e., performance), and retirement may be examples of different pipeline stages. Many different pipeline architectures are possible with varying orderings of elements/portions. Various pipeline stages perform such steps on an instruction during one or more processor clock cycles, then pass the instruction or operations associated with the instruction on to other stages for further processing.

The term "SIMD group" is intended to be interpreted according to its well-understood meaning, which includes a set of threads for which processing hardware processes the same instruction in parallel using different input data for the different threads. SIMD groups may also be referred to as SIMT (single-instruction, multiple-thread) groups, single instruction parallel thread (SIPT), or lane-stacked threads. Various types of computer processors may include sets of pipelines configured to execute SIMD instructions. For example, graphics processors often include programmable shader cores that are configured to execute instructions for a set of related threads in a SIMD fashion. Other examples of names that may be used for a SIMD group include: a wavefront, a clique, or a warp. A SIMD group may be a part of a larger threadgroup of threads that execute the same program, which may be broken up into a number of SIMD groups (within which threads may execute in lockstep) based on the parallel processing capabilities of a computer. In some embodiments, each thread is assigned to a hardware pipeline (which may be referred to as a "lane") that fetches operands for that thread and performs the specified operations in parallel with other pipelines for the set of threads. Note that processors may have a large number of pipelines such that multiple separate SIMD groups may also execute in parallel. In some embodiments, each thread has private operand storage, e.g., in a register file. Thus, a read of a particular register from the register file may provide the version of the register for each thread in a SIMD group.

As used herein, the term "thread" includes its well-understood meaning in the art and refers to sequence of program instructions that can be scheduled for execution independently of other threads. Multiple threads may be included in a SIMD group to execute in lock-step. Multiple threads may be included in a task or process (which may correspond to a computer program). Threads of a given task may or may not share resources such as registers and memory. Thus, context switches may or may not be performed when switching between threads of the same task.

In some embodiments, multiple programmable shader units 160 are included in a GPU. In these embodiments, global control circuitry may assign work to the different sub-portions of the GPU which may in turn assign work to shader cores to be processed by shader pipelines.

TPU 165, in the illustrated embodiment, is configured to schedule fragment processing tasks from programmable shader 160. In some embodiments, TPU 165 is configured to pre-fetch texture data and assign initial colors to fragments for further processing by programmable shader 160 (e.g., via memory interface 180). TPU 165 may be configured to provide fragment components in normalized integer formats or floating-point formats, for example. In some embodiments, TPU 165 is configured to provide fragments in groups of four (a "fragment quad") in a 2×2 format to be processed by a group of four execution pipelines in programmable shader 160.

Image write buffer 170, in some embodiments, is configured to store processed tiles of an image and may perform operations to a rendered image before it is transferred for display or to memory for storage. In some embodiments, graphics unit 150 is configured to perform tile-based deferred rendering (TBDR). In tile-based rendering, different portions of the screen space (e.g., squares or rectangles of pixels) may be processed separately. Memory interface 180 may facilitate communications with one or more of various memory hierarchies in various embodiments.

As discussed above, graphics processors typically include specialized circuitry configured to perform certain graphics processing operations requested by a computing system. This may include fixed-function vertex processing circuitry, pixel processing circuitry, or texture sampling circuitry, for example. Graphics processors may also execute non-graphics compute tasks that may use GPU shader cores but may not use fixed-function graphics hardware. As one example, machine learning workloads (which may include inference, training, or both) are often assigned to GPUs because of their parallel processing capabilities. Thus, compute kernels executed by the GPU may include program instructions that specify machine learning tasks such as implementing neural network layers or other aspects of machine learning models to be executed by GPU shaders. In some scenarios, non-graphics workloads may also utilize specialized graphics circuitry, e.g., for a different purpose than originally intended.

Further, various circuitry and techniques discussed herein with reference to graphics processors may be implemented in other types of processors in other embodiments. Other types of processors may include general-purpose processors such as CPUs or machine learning or artificial intelligence accelerators with specialized parallel processing capabilities. These other types of processors may not be configured to execute graphics instructions or perform graphics operations. For example, other types of processors may not include fixed-function hardware that is included in typical GPUs. Machine learning accelerators may include specialized hardware for certain operations such as implementing neural network layers or other aspects of machine learning models. Speaking generally, there may be design tradeoffs between the memory requirements, computation capabilities, power consumption, and programmability of machine learning accelerators. Therefore, different implementations may focus on different performance goals. Developers may select from among multiple potential hardware targets for a given machine learning application, e.g., from among generic processors, GPUs, and different specialized machine learning accelerators.

In the illustrated example, graphics unit 150 includes ray intersect accelerator (RIA) 190, which may include hardware configured to perform various ray intersect operations (e.g., for traversal of a bounding volume hierarchy acceleration data structure) in response to instruction(s) executed by programmable shader 160, as described in detail below.

Overview of Progressive Quantization of Primitive Data

Figure 2:
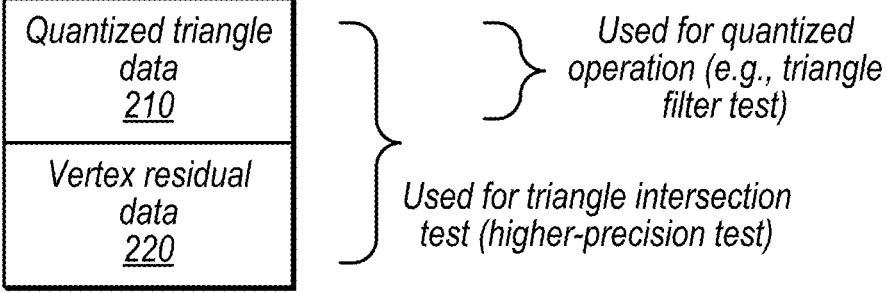
FIG. 2 is a diagram illustrating example quantized and residual triangle data of a bounding volume hierarchy (BVH) node, according to some embodiments.

FIG. 2 is a diagram illustrating example quantized and residual triangle data of abounding volume hierarchy (BVH) node, according to some embodiments. In the illustrated example, quantized triangle data 210 is used for quantized operations such as triangle filter tests while both the quantized triangle data and the vertex residual data are used for higher precision operations (e.g., original precision without loss) such as triangle/ray intersect tests.

This is a form of progressive compression, which generally provides successively more accurate representations of a set of data as more data is received. In this case, the quantized triangle data 210 provides one level of precision while the combination of both sets of data 210 and 220 provide a higher level of precision. In various embodiments discussed in detail below, quantization techniques provide fully accurate topology and fine-grained random access.

Detailed Example Quantization and Encoding

Figure 3:
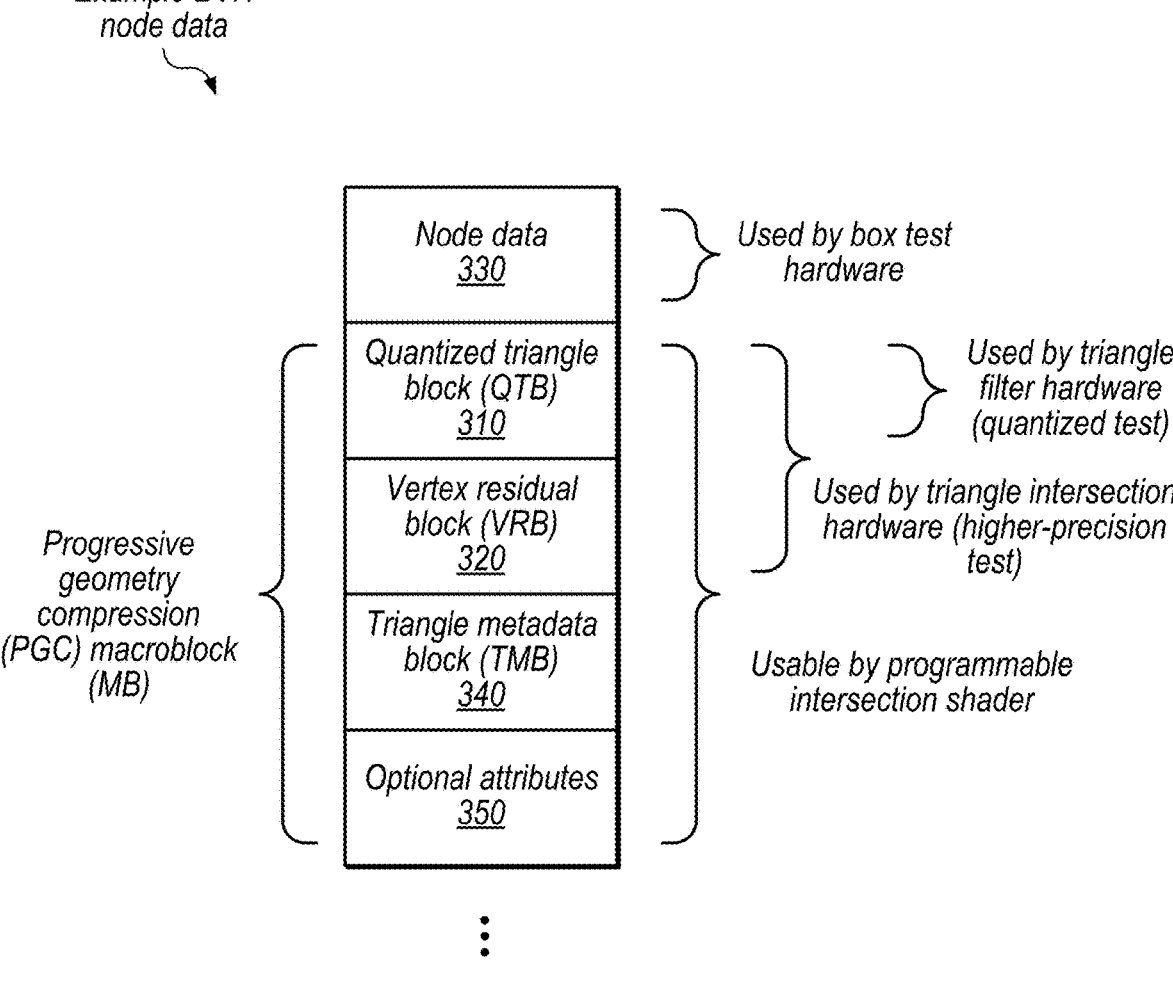
FIG. 3 is a diagram illustrating a more detailed example node encoding that includes node data, quantized triangle block (QTB) data, vertex residual block (VRB) data, triangle metadata block (TMB), and optional attribute portions, according to some embodiments.

FIG. 3 is a diagram illustrating a more detailed example node encoding that includes node data, quantized triangle block (QTB) data, vertex residual block (VRB) data, triangle metadata block (TMB), and optional attribute portions, according to some embodiments.

The illustrated encoding may be used in the context of an axis-aligned BVH where internal nodes indicate bounding boxes for each child node and leaf nodes indicate child geometry (e.g., up to N triangles, although disclosed compression techniques may be used with graphics primitives of various other shapes). Note that a given node may specify both one or more child nodes and one or more child primitives.

In some embodiments, a given node includes node data 330 and its primitives are partitioned into one or more progressive geometry compression (PGC) macroblocks (MBs), one of which is shown in FIG. 3. As shown, a given macroblock is constructed of at three least segments, including: a quantized triangle block 310, a vertex residual block 320, and a triangle metadata block 340 (and optionally, triangle attributes 350).

The node data 330, in some embodiments, provides bounding box data for any child nodes. Node data 330 may also provide quantization frame information and other parameters that may be relevant to the quantized triangle data. In some embodiments, node data 330 specifies, in a compact form: the number of triangles, the number of macroblocks, the number of triangles per macroblock, the size of the VRB for each macroblock, and the amount of per-triangle uncompressed attribute data 350. Example node data encodings are discussed below with reference to FIG. 4.

A given QTB 310, in some embodiments, has a fixed size, e.g., corresponding to the size of a cache line in one or more caches that are configured to cache data for ray intersection accelerator 190. A QTB 310 may utilize a fixed bit count per vertex component and may utilize vertex indexing to reduce data size, e.g., when vertices are shared by multiple triangles. Example QTB encodings are discussed below with reference to FIG. 5.

A given VRB 320, in some embodiments, stores residual information that allows a complete reconstruction of a triangle, at its full original precision, in combination with corresponding quantized data for the triangle in a QTB. The VRB may include one or more fixed-size data chunks (e.g., corresponding in size to a cache line, half a cache line, a quarter of a cache line, etc.). Note that the concept of a "cache line" is well understood by those of skill in the art and is typically the granularity at which cache hits and misses are determined. For example, each cache line may have corresponding tag information that is compared to a portion of incoming addresses.

In some embodiments, the VRB does not store any redundant information with the QTB. Therefore, utilizing VRB may substantially reduce node data sizes, e.g., relative to encoding both quantized triangle data and full-precision triangle data separately (in which case a portion of the full-precision triangle data would be redundant with the quantized data). In some embodiments, one VRB and one TMB fit on a single cache line. Example VRB encodings are discussed below with reference to FIG. 6.

Note that in other embodiments, additional progressive quantization levels may be implemented. In these embodiments a VRB and QTB together may allow construction of a triangle at a given precision, which may be less than the original precision, and supplemental residual data may be further combined to arrive at the original precision. Thus, disclosed progressive quantization techniques are included for purposes of illustration but are not intended to limit the number of progressive levels, the quantization amount at a given level, specific quantization encodings, etc.

A given TMB 340, in some embodiments, has a fixed size and stores per-primitive metadata such as primitive ID, geometry ID, and associated shader information. The TMB may include per-primitive non-geometric information that is not needed to test for an intersection in hardware but is used to record a detected intersection or to invoke a programmable shader to evaluate the intersection. While different embodiments may utilize different types of TMB information, generally this information may track the identities of primitives in the context of a full scene specification. Example TMB encodings are discussed below with reference to FIG. 7.

Optional attributes 350 may include per-triangle attribute data potentially used by programmable software, e.g., for purposes of hit acceptance or other uses (e.g., texture UV coordinates used in evaluating alpha maps, which may result in rejection of a hardware-determined ray-triangle intersection). As mentioned above, a given macroblock may or may not include optional attributes 350. Note that, in some embodiments, fields 340 and 350 are read by software and are not read by fixed-function hardware.

Nodes with multiple macroblocks may store the macroblocks sequentially or may interleave the macroblocks (E.g., with the QTBs for all macroblocks of the node first, followed by the VRBs, then the TMBs, then the optional attributes 350 (if present)). An interleaved layout may reduce addressing math calculations and reduce or avoid padding for data alignment restrictions. The BVH builder may attempt multiple node encodings with different numbers of macroblocks and select an encoding that is more desirable in terms of one or more target attributes (e.g., overall node size at a given QTB quantization level, etc.).

FIG. 4 is a diagram illustrating an example encoding of the node data portion of FIG. 3, according to some embodiments. In the illustrated example, the node information includes quantization frame scale factors 410, quantization frame origin 420, data 430 (that indicates a number of triangles, number of macroblocks, and triangles per macroblock), the VRB size per macroblock, and the size of optional attributes 350.

The quantization frame scale factors may be specified for x, y, and z dimensions and the quantization frame origin may include x, y, and z components. These values may be used to interpret quantized bounding box and triangle values of the node. Specifically, the quantization frame may define a translation and non-uniform scale transformation of object-space in order to record a set of points in a local region of space (e.g., corresponding to the bounding box associated with the node). The scale factors 410 may define the region of space encodable using the fixed number of bits used in the QTB.

Consider, for example, a QTB that stores 8 bits per vertex and is constructed to represent vertex coordinates in the range [10.0, 20.0]. In this example, the scale factor would be $>=(20.0-10.0)/(2^8-1)\sim=0.0392156862745098$. The floating-point arithmetic for this expression may be exact by construction or use round toward positive infinity (RTPI) rounding behavior in order to ensure that the inequality is satisfied. In some embodiments, the scale factors are limited to powers of two, which may be advantageous for storage and computational efficiency reasons. In the example above, the next largest power of two from $0.0392156862745098$ is $2^{-4}=0.0625$. These techniques may allow storage of only the exponent in the QTB for each scale factor.

The remaining fields 430, 440, and 450 may facilitate decode of the node information, e.g., using the information to determine the number of filter or full-precision tests to perform for the node, calculating memory addresses of macroblocks, QTBs, VRBs, etc., and decoding triangles within those blocks. As discussed above, a given node may also include other information not shown, e.g., coordinates for bounding boxes.

FIG. 5 is a diagram illustrating an example encoding of the QTB portion of FIG. 3, according to some embodiments. In the illustrated example, the QTB includes a bit count per component field 510, vertex indices for included triangles 520B-520N (e.g., three indices per triangle), and quantized data for vertices 530A-530M.

In the illustrated example, the bit count per vertex component is fixed across all axes and all vertices, although bit count per component may vary within a QTB in other embodiments. Field 510 indicates this fixed bit count, which may be determined by a BVH builder based on the number of triangles for the node, tolerance for quantization error, etc. (Note that the BVH may be built/updated by software or at least partially accelerated in hardware, therefore the BVH builder may be software, hardware, or a combination thereof). Generally, a greater number of bits in field 510 may potentially increase flexibility in bit count per component but may increase decode hardware complexity.

The indices 520, in some embodiments, indicate the index of quantized data for a given vertex. For triangle B vertex 0, for example, the index may indicate the offset within the array of vertices of vertex data 530M. Vertices may be shared among triangles and may be deduplicated such that a given vertex is included in the array of quantized vertex data 530 only once. Note that the first triangle's indices are implied, in this example, to be 0, 1, 2. Therefore, those indices are not included in indices 520.

In some embodiments, the QTB format includes a field that encodes the number of bits per vertex in the corresponding VRB. This field may be referred to as a residual bits (rBits) field. This information may provide a more accurate VRB size relative to the size indicated by the node header.

For example, the VRB may be sized for worst-case residual, but the actual size used may be smaller. In this case, the rBits field may avoid fetching unnecessary portions of the VRB. Further, RIA 190 may use this field to fetch exact cache lines utilized for the residuals of a given triangle, rather than fetching the entire VRB. The number of bits used to represent the rBits field may vary depending on the number of supported granularities of residual data, for example.

FIG. 6 is a diagram illustrating an example encoding of the VRB portion of FIG. 3, according to some embodiments. In the illustrated example, the VRB indicates counts of stored bits of precision for each axis in fields 610, 620, and 630 and interleaved vertex residual data 640 (where interleaving among the different axes may facilitate random access to residual data for a given triangle and vertex).

Note that a field in the header (e.g., 610, 620, or 630) may have a value of zero, e.g., when the entire original vertex precision was able to be stored in the QTB for that axis. Further a value (e.g., the max value) may be reserved to indicate that a particular axis stores a full-precision floating-point value instead of a quantized residual value. This may be a fallback when more than $2^N-2$ bits are needed to fully record a quantized vertex position, where N is the number of bits of one of the header fields 610, 620, or 630. Note that N need not be greater than a value needed to represent a number of bits in the full-precision representation (e.g., N≤5 for 32-bit precision). Smaller values of N may be used when specifying the number of bits for a given axis at a lower precision (e.g., N−1 bits to allow unique vertex component field widths of 0, 2, 4, 6, etc.). In some embodiments, this ensures that progressive compression techniques do not generate a larger memory footprint than would have been generated by a non-progressive technique.

In the illustrated example, the VRB is encoded using one to M fixed-size data chunks where M is an integer (e.g., depending on the number of triangles and the number of stored bits of precision for each axis).

FIG. 7 is a diagram illustrating an example encoding of the TMB portion of FIG. 3, according to some embodiments. In the illustrated example, the TMB includes header 710, geometry identifiers 720, per-triangle indices 730 into the geometry identifiers, triangle primitive identifier upper bits 740, and per-triangle primitive identifier lower bits 750A-750N. In the illustrated example, the TMB has a fixed size (e.g., such that the TMB and one VRB fit in a cache line, in some embodiments). If the TMB for a given macroblock configuration cannot be encoded using the fixed size, the BVH builder may use more macroblocks (e.g., to divide the data among multiple TMBs in different macroblocks) or may determine not to compress triangles for the node.

Header 710, in some embodiments, indicates the number of unique geometry IDs 720 and the number of shared upper bits of the triangle primitive ID 740. In a common case where there is a single geometry ID 720, the per-triangle indices 730 may be omitted (e.g., because all the triangles represented by the TMB have the same geometry ID). Otherwise, each triangle has an index 730 that indicates one of the geometry IDs in field 720.

The triangle primitive ID upper bits 740, in some embodiments, are more-significant bits of the triangle ID that are shared among multiple triangles. Including these bits only once may reduce the size data for the overall node. The remaining lower bits of a given primitive ID are specified in one of the fields 750.

Figure 8:
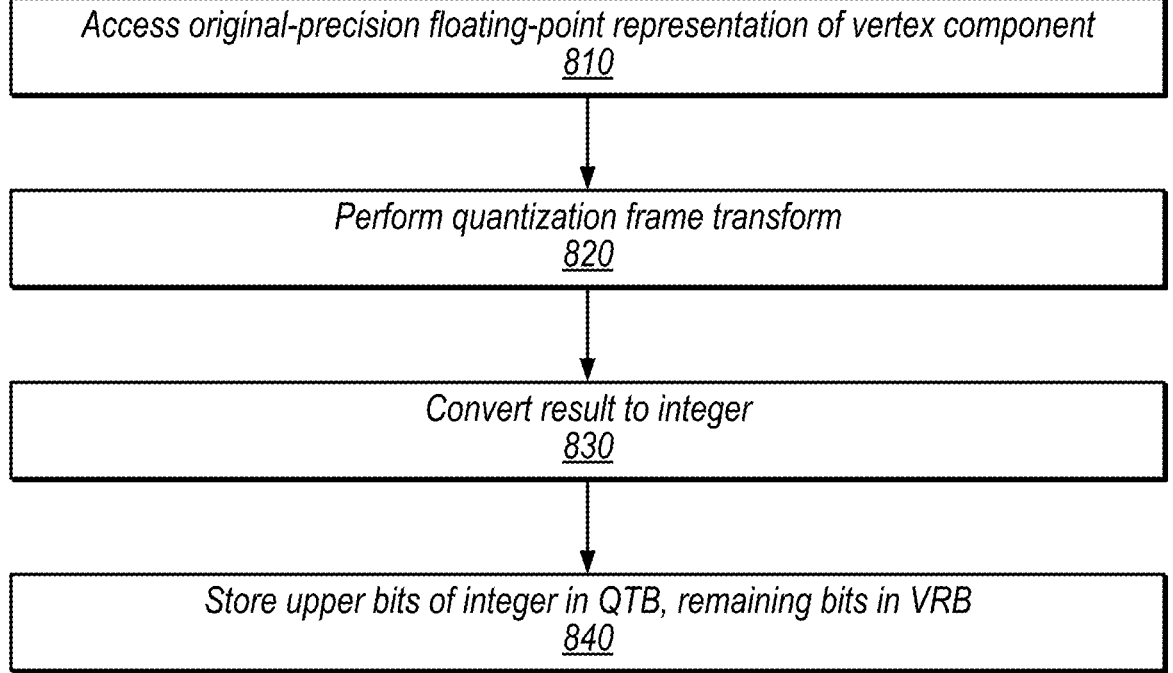
FIG. 8 is a flow diagram illustrating an example quantization technique for one component of a vertex that generates both quantized triangle block and vertex residual block data for the component, according to some embodiments.

FIG. 8 is a flow diagram illustrating an example quantization technique for one component of a vertex that generates both QTB and VRB data for the component, according to some embodiments. First, the BVH builder accesses the original-precision floating-point representation of the vertex component at 810.

At 820, the BVH builder performs a quantization frame transform. For example, to quantize a floating-point vertex coordinate x into a quantization frame, e.g., storing 8-bit coordinates with an x-axis scale factor s and origin x-coordinate p, the following transformation may be used:

$$tx = (x - p)/s$$

where the transformed value tx may be directly converted from floating-point to an integer value qx without loss of precision (e.g., as shown at 830).

At 840, The BVH builder divides the integer value into upper bits for the QTB (e.g., 8 bits in the examples above) and the lower bits (referred to as residual bits) for storage in the VRB. To decode a vertex value component value stored on the QTB and VRB (to obtain the value at original precision), acceleration hardware may perform the reverse procedure: concatenate the bits from the QTB and VRB, convert to floating point, and apply the quantization frame transformation inverse. This will losslessly recover the original floating-point value without storing any data in the VRB that is redundant with QTB data, in some embodiments.

Note that the disclosed techniques for quantization and separation into quantized and residual data are included for purposes of illustration, but are not intended to limit the scope of the present disclosure. In other embodiments, various appropriate quantization techniques may be utilized, with residual data stored separately (and the residual data may include some redundant data with the quantized data, in other embodiments, although this may increase overall BVH size). Generally, however, in various embodiments the residual data utilizes a substantially smaller number of bits than would be used to represent a given vertex component in its original precision, while still allowing fast hardware access to reconstruct the original-precision representation.

Example Acceleration Hardware

Figure 9:
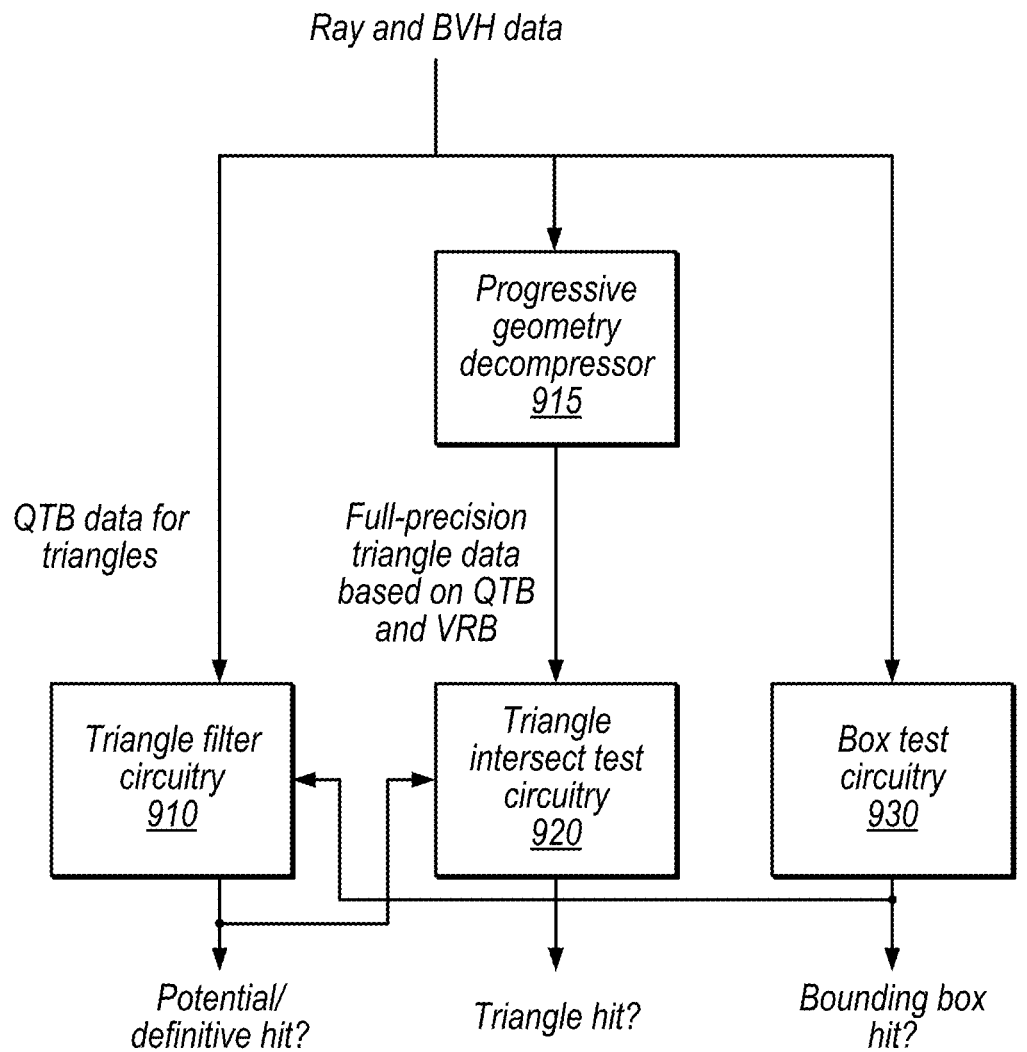
FIG. 9 is a block diagram illustrating example triangle filter, triangle intersection test, and box test circuitry, according to some embodiments.

FIG. 9 is a block diagram illustrating example triangle filter, triangle intersection test, and box test circuitry, according to some embodiments. In the illustrated example, various hardware accelerator circuitry receives ray data and BVH data (e.g., encoded using disclosed QTB and VRB techniques). The illustrated circuitry may be included in ray intersect accelerator 190. Various operations performed by acceleration circuitry in FIG. 9 may be performed by software in certain situations or other embodiments.

Triangle filter circuitry 910, in the illustrated embodiment, receives the ray data and QTB data for triangles (but not the VRB data) and generates filter results that indicate whether a hit is possible. (Note that filter circuitry 910 may also detect a definitive hit, as discussed in the '483 application, in certain scenarios). If a full-prevision ray/triangle intersection test is indicated, the triangle filter circuitry may indicate this result to the triangle intersect test circuitry 920 (or to other control circuitry configured to control such tests).

Progressive geometry decompressor circuitry 915, in the illustrated embodiment, is configured to access both QTB and VRB data and decode the data to provide full-precision triangle data to triangle intersect test circuitry 920. In some embodiments, circuitry 915 is configured to add a quantized vertex value from the QTB to a vertex residual value from the VRB to generate an integer vertex coordinate within the quantization frame, then convert the integer coordinates to a floating-point vertex position. Circuitry 915 may also detect and handle certain special cases, e.g., where the residual includes the full floating-point data and there is no need to read quantized data. In some embodiments, the encoding process is performed with checks to ensure that the decode operations do not require any rounding (and may fall back to storing the full-precision floating-point value in the residual if this cannot be accomplished). Therefore, circuitry 915 does not include rounding circuitry, in some embodiments.

Triangle intersect test circuitry 920, in the illustrated embodiment, receives the ray data and the full-precision triangle data. Circuitry 920 then outputs an indication of whether there was a triangle hit. For a hit, RIA 190 may record the hit, e.g., using data from the corresponding TMB.

Box test circuitry 930, in the illustrated example, receives ray data and quantized bounding box data and determines bounding box hits and misses, which may be used to determine traversal operations within the BVH. As shown, bounding box hits may also cause triangle filter tests by circuitry 910 on any leaves of intersected boxes.

Example Vertex Deduplication and Triangle Assignment Techniques

As discussed above, triangles often share vertices and data may be compressed by recording vertex coordinates once, such that triangles that share the vertex reference the location of the coordinates (e.g., using an index, pointer, etc.). Further, various embodiments discussed above may quantize and encode triangle data using a variable number of macroblocks (e.g., as shown in FIG. 3) that include QTB data, VRB data, etc. for a portion of the triangles stored for a given node. These techniques may facilitate efficient cache access, e.g., by storing QTB and VRB data in chunks that correspond in size to cache lines (or at least align with cache lines).

Further, the BVH builder may check multiple different assignments of triangles to macroblocks within a node to determine which assignment provides the best compression (e.g., results in the smallest number of VRB chunks in a macroblock or overall data size for a node that may include multiple macroblocks).

Therefore, when targeting cache lines and attempting different triangle assignments, various assignments of triangles to QTBs may be considered for potential vertex deduplication. Performing deduplication operations for each different assignment may impact performance and power consumption of the BVH builder. Therefore, in disclosed embodiments discussed in detail below, a multi-stage deduplication technique generates a node-wide hash table and generates bit vectors corresponding to hash table indices to facilitate fast deduplication within a subset of triangles of the node.

FIG. 10 is a flow diagram illustrating an example method for deduplicating vertices to generate QTB data, according to some embodiments. At 1010, in the illustrated example, the BVH builder deduplicates vertices of up to T triangles included in a leaf node and generates a node-wide hash table for the node. This hash table may include up to N unique vertices and up to M entries (if all vertices were unique then N would be equal to 3T, but typically triangles share vertices). The number of entries M may be at least as large as the greatest possible N (larger, in some embodiments).

At 1020, the BVH builder assigns subsets of triangles to different QTBs (e.g., in different macroblocks). This may include trying different assignments of triangles within a given number of QTBs, trying assignments using different numbers of QTBs, or both. As discussed above, it may be undesirable to replicate the operations of 1010 for vertices of each subset of triangles. Therefore, in the illustrated example, the BVH builder generates a bit vector of unique vertices in a given assignment of triangles (based on indices into the node-wide hash table, e.g., by setting a bit corresponding to each index used). A detailed explanation and example of this procedure are provided below with reference to FIGS. 11 and 12. As discussed above, the BVH builder may attempt multiple assignments and may pick an assignment providing the best compression.

At 1030, the BVH builder generates the QTB data based on the selected assignments, e.g., using the technique of FIG. 8 to quantize the QTB data. This may use the bit vector generated at 1020 to access the node-wide hash table and retrieve the vertex data from the indicated indices (e.g., to populate corresponding triangle index fields 520).

At 1040, the BVH builder generates TMB data corresponding to the QTB and VRB data. Note that elements 1020, 1030, and 1040 may be performed partially in parallel, in different orders, iteratively, etc., e.g., in order to balance BVH build time with BVH data size.

Figure 11:
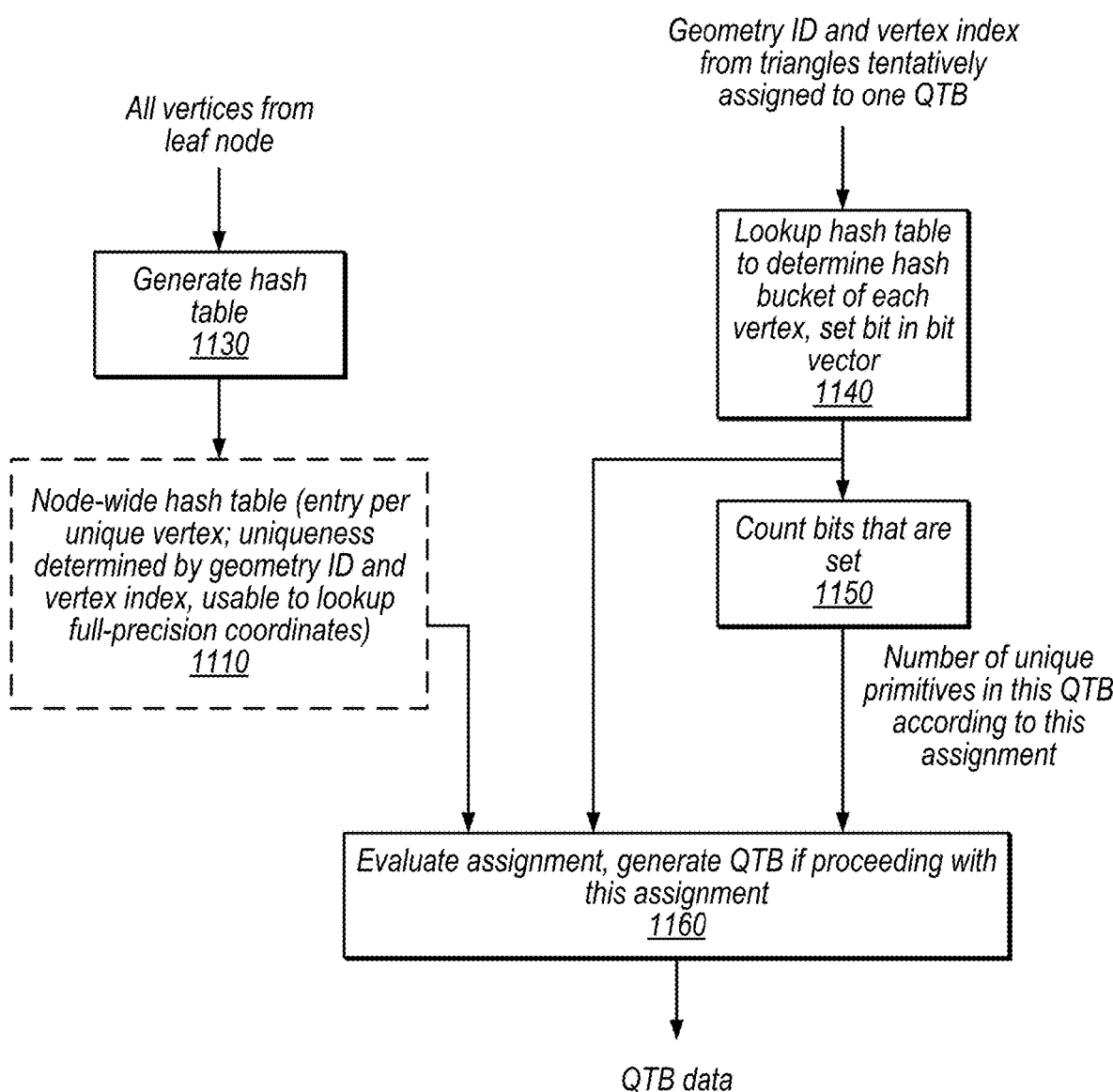
FIG. 11 is a diagram illustrating example tables and operations for deduplication in the context of evaluating different assignments of triangles to quantized triangle blocks, according to some embodiments.

FIG. 11 is a diagram illustrating an example table and operations for deduplication in the context of evaluating different assignments of triangles to QTBs, according to some embodiments. In the illustrated example, the BVH builder utilizes a node-wide hash table 1110.

AT 1130, the BVH builder inputs all vertices from the leaf node and generates the hash table 1110. This may be performed once per encounter of the leaf node during traversal of the BVH. This deduplication may determine uniqueness based on geometry identifier (ID) and vertex index, for example. Table 1110 may be usable to lookup the full-precision vertex coordinates to be used for quantization. As discussed above, however, it may not be desirable to generate such a hash table for each subset of triangles assigned to a QTB.

Elements 1140 and 1150 may be performed once for a given potential assignment of a subset of triangles to a QTB. At 1140, the BVH builder receives geometry IDs and vertex indices for a subset of triangles of the leaf node that are tentatively assigned to one QTB. For each vertex, the BVH builder looks up hash table 1110 and sets a bit in a bit vector corresponding to the hit index in the hash table 1110. Therefore, for a given assignment of triangles to a QTB, a bit field of M bits is created, setting a bit at each index retrieved. The bit field indicates the set of unique vertices for this subset of triangles.

At 1150, the BVH builder counts the number of bits that are set in the bit field, which indicates the number of unique primitives in this QTB (e.g., the number of fields 530).

The following pseudocode indicates the operations of elements 1140 and 1150, according to some embodiments.

```
candidate.bitmask[M bits] = 0
foreach triangle in candidate:
    for each vertex 0..2:
        int hashBucket = lookupInHashTable(geomID, VertexIndex)
        candidate.bitmask[hashBucket] = 1
    candidate.numUniqueVertices = countBits(candidate.bitmask)
```

At 1160, the BVH builder evaluates a given assignment of primitives to a QTB and the various parameters for the assignment, such as the size required to store each vertex, the number of unique vertices, and other conditions, e.g., to determine if the assignment is usable (e.g., fits within a fixed TMB size) and provides good compression (e.g., relative to other potential assignments). If so, the BVH builder generates the QTB data (e.g., using the techniques of FIG. 8). For example, the BVH builder may use the bit vector to access the appropriate indices in table 1110 and retrieve the full-precision data for quantization.

Note that the per-node hash table may substantially improve performance, e.g., relative to a per-candidate-QTB hash table or relative to generating bitmask information with entries for every vertex in a given scene.

Figure 12:
FIG. 12 is a diagram illustrating a detailed example of triangle data and a deduplication bit vector based on hash table indices, according to some embodiments.

FIG. 12 is a diagram illustrating a detailed example of triangle data and a deduplication bit vector based on hash table indices, according to some embodiments. In the illustrated example, Triangle A and triangle B share two vertices. FIG. 12 shows an example output bit vector for triangles A and B for this situation, where each unique index from the node-wide hash table causes a bit to be set in the output bit vector (four set bits in this example, for the four unique vertices among the two triangles). As discussed above, the number of sets bits may be helpful for the BVH builder to determine whether this is a desirable assignment of triangles to QTBs, relative to other assignments (e.g., in which triangles A and B might be assigned to different QTBs).

Example Methods

FIG. 13 is a flow diagram illustrating an example method for generating a BVH, according to some embodiments. The method shown in FIG. 13 may be used in conjunction with any of the computer circuitry, systems, devices, elements, or components disclosed herein, among others. In various embodiments, some of the method elements shown may be performed concurrently, in a different order than shown, or may be omitted. Additional method elements may also be performed as desired.

At 1310, in the illustrated embodiment, a computing system generates abounding volume hierarchy (BVH) data structure for a graphics scene to be rendered. In this embodiment, the BVH includes a leaf node that includes: node data that specifies quantization frame data for quantized primitive children of the leaf node, a quantized primitive block that includes quantized vertex components of the primitive children, and a vertex residual block that includes additional vertex data for the primitive children. In this embodiment, the vertex residual block does not include redundant data with the quantized primitive block and the quantized primitive block and vertex residual block include, for the primitive children, sufficient data to reconstruct an original-precision representation of their vertices.

In some embodiments, the leaf node further includes a primitive metadata block that includes identifier information for the primitive children.

In some embodiments, the primitive metadata block has a size that is smaller than or equal to a size of cache lines of a data cache included in the graphics processor. In some embodiments, the quantized primitive block has a size that is smaller than or equal to a size of cache lines of a data cache included in the graphics processor. In some embodiments, the vertex residual block includes one or more data chunks that each have a size that is smaller than or equal to a size of cache lines of a data cache included in the graphics processor.

In some embodiments, the node data specifies quantization frame scale factors for multiple axes, a quantization frame origin, a number of primitive children of the node, and a number of quantized primitive blocks for the node.

In some embodiments, the quantized primitive block encodes: a bit count per component, an array of quantized data for unique vertices, and per-primitive indices into the array of quantized data. In some embodiments, the vertex residual block encodes: a count of stored bits of precision for multiple axes and residual bits of vertex data that was not representable using the bit count per component encoded by the quantized primitive block. In some embodiments, the primitive metadata block encodes: a header that indicates a number of geometry identifiers and a number of primitive identifier upper bits, per-primitive indices into an array of geometry identifiers, a set of shared upper primitive identifier bits, and per-primitive sets of lower primitive identifier bits.

At 1320, in the illustrated embodiment, the computing system traverses the BVH to perform ray tracing operations during render of the graphics scene, including to perform one or more ray primitive intersect tests based on the quantized primitive block and the vertex residual block.

In some embodiments, generation of the BVH and traversal of the BVH are performed by separate components. For example, a processor may execute instructions to generate the BVH and accelerator hardware may perform at least a portion of the traversal of the BVH.

In some embodiments, the system includes: triangle filter circuitry configured to perform a quantized ray primitive intersect test based on the quantized primitive block and triangle intersect test circuitry configured to perform an original-precision ray primitive intersect test based on decode of the quantized primitive block and the vertex residual block.

Figure 14:
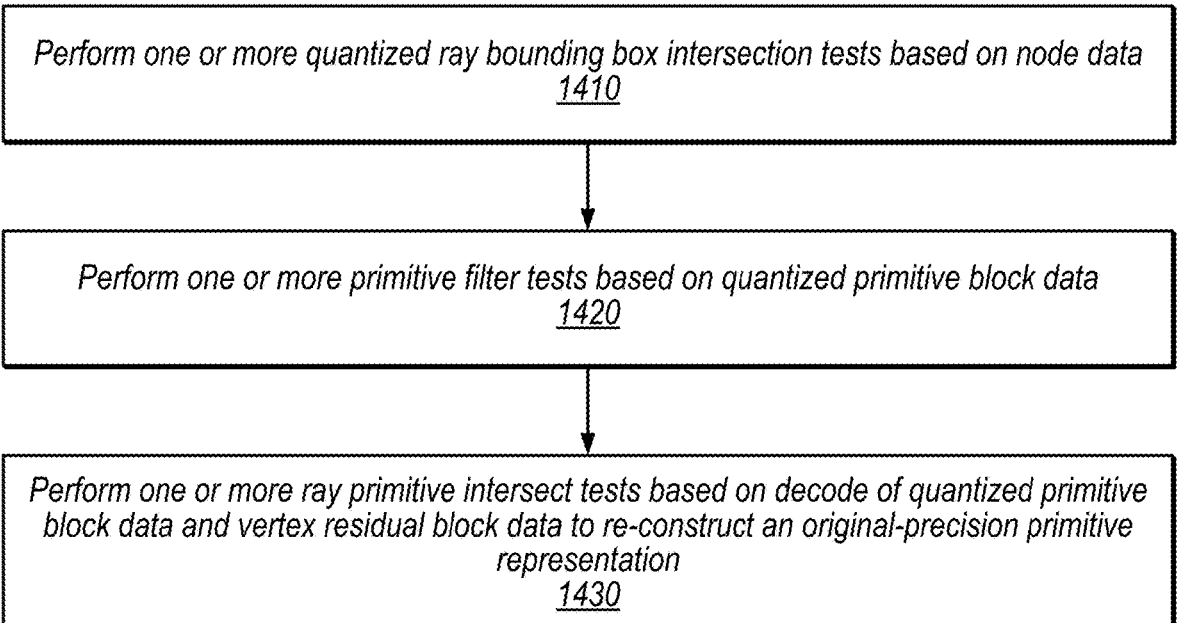

FIG. 14 is a flow diagram illustrating an example method for traversing an acceleration data structure, according to some embodiments. The method shown in FIG. 14 may be used in conjunction with any of the computer circuitry, systems, devices, elements, or components disclosed herein, among others. In various embodiments, some of the method elements shown may be performed concurrently, in a different order than shown, or may be omitted. Additional method elements may also be performed as desired.

In some embodiments, the elements of FIG. 14 are performed during traversal of a bounding volume hierarchy generated according to disclosed embodiments.

At 1410, in the illustrated embodiment, a computing system performs one or more quantized ray bounding box intersection tests based on node data.

At 1420, in the illustrated embodiment, the computing system performs one or more primitive filter tests based on quantized primitive block data.

At 1430, in the illustrated embodiment, the computing system performs one or more ray primitive intersect tests based on decode of quantized primitive block data and vertex residual block data to re-construct an original-precision primitive representation.

FIG. 15 is a flow diagram illustrating an example method for deduplication, according to some embodiments. The method shown in FIG. 15 may be used in conjunction with any of the computer circuitry, systems, devices, elements, or components disclosed herein, among others. In various embodiments, some of the method elements shown may be performed concurrently, in a different order than shown, or may be omitted. Additional method elements may also be performed as desired.

At 1510, in the illustrated embodiment, a computing system generates, for a node of a bounding volume hierarchy for a graphics scene, an array of unique vertices of primitive children of the node.

At 1520, in the illustrated embodiment, the computing system performs the operation of element 1530 for multiple different proper subsets of primitive children of the node.

At 1530, in the illustrated embodiment, the computing system looks up, the array, for vertices of the proper subset, to determine a set of indices in the array for the proper subset.

At 1540, in the illustrated embodiment, the computing system selects an assignment of primitive children to quantized primitive blocks based on the sets of indices corresponding to the multiple different proper subsets.

At 1550, in the illustrated embodiment, the computing system generates a quantized primitive block for the selected assignment of primitive children, according to the selected assignment, where the quantized primitive block utilizes a fixed number of bits per quantized vertex component.

Example Device

Figure 16:
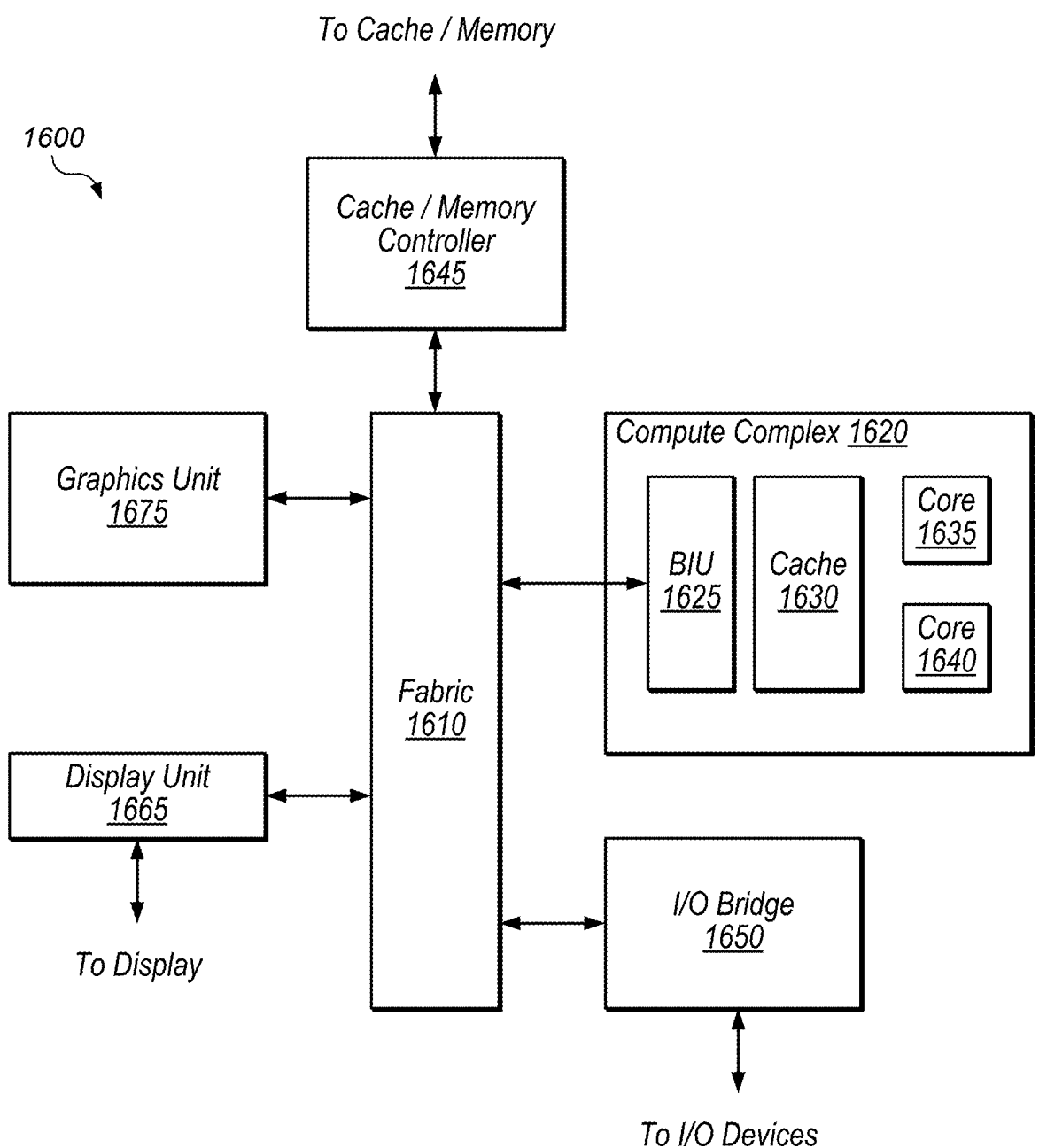
FIG. 16 is a block diagram illustrating an example computing device, according to some embodiments.

Referring now to FIG. 16, a block diagram illustrating an example embodiment of a device 1600 is shown. In some embodiments, elements of device 1600 may be included within a system on a chip. In some embodiments, device 1600 may be included in a mobile device, which may be battery-powered. Therefore, power consumption by device 1600 may be an important design consideration. In the illustrated embodiment, device 1600 includes fabric 1610, compute complex 1620 input/output (I/O) bridge 1650, cache/memory controller 1645, graphics unit 1675, and display unit 1665. In some embodiments, device 1600 may include other components (not shown) in addition to or in place of the illustrated components, such as video processor encoders and decoders, image processing or recognition elements, computer vision elements, etc.

Fabric 1610 may include various interconnects, buses, MUX's, controllers, etc., and may be configured to facilitate communication between various elements of device 1600. In some embodiments, portions of fabric 1610 may be configured to implement various different communication protocols. In other embodiments, fabric 1610 may implement a single communication protocol and elements coupled to fabric 1610 may convert from the single communication protocol to other communication protocols internally.

In the illustrated embodiment, compute complex 1620 includes bus interface unit (BIU) 1625, cache 1630, and cores 1635 and 1640. In various embodiments, compute complex 1620 may include various numbers of processors, processor cores and caches. For example, compute complex 1620 may include 1, 2, or 4 processor cores, or any other suitable number. In one embodiment, cache 1630 is a set associative L2 cache. In some embodiments, cores 1635 and 1640 may include internal instruction and data caches. In some embodiments, a coherency unit (not shown) in fabric 1610, cache 1630, or elsewhere in device 1600 may be configured to maintain coherency between various caches of device 1600. BIU 1625 may be configured to manage communication between compute complex 1620 and other elements of device 1600. Processor cores such as cores 1635 and 1640 may be configured to execute instructions of a particular instruction set architecture (ISA) which may include operating system instructions and user application instructions. These instructions may be stored in computer readable medium such as a memory coupled to memory controller 1645 discussed below.

As used herein, the term "coupled to" may indicate one or more connections between elements, and a coupling may include intervening elements. For example, in FIG. 16, graphics unit 1675 may be described as "coupled to" a memory through fabric 1610 and cache/memory controller 1645. In contrast, in the illustrated embodiment of FIG. 16, graphics unit 1675 is "directly coupled" to fabric 1610 because there are no intervening elements.

Cache/memory controller 1645 may be configured to manage transfer of data between fabric 1610 and one or more caches and memories. For example, cache/memory controller 1645 may be coupled to an L3 cache, which may in turn be coupled to a system memory. In other embodiments, cache/memory controller 1645 may be directly coupled to a memory. In some embodiments, cache/memory controller 1645 may include one or more internal caches. Memory coupled to controller 1645 may be any type of volatile memory, such as dynamic random access memory (DRAM), synchronous DRAM (SDRAM), double data rate (DDR, DDR2, DDR3, etc.) SDRAM (including mobile versions of the SDRAMs such as mDDR3, etc., and/or low power versions of the SDRAMs such as LPDDR4, etc.), RAMBUS DRAM (RDRAM), static RAM (SRAM), etc. One or more memory devices may be coupled onto a circuit board to form memory modules such as single inline memory modules (SIMMs), dual inline memory modules (DIMMs), etc. Alternatively, the devices may be mounted with an integrated circuit in a chip-on-chip configuration, a package-on-package configuration, or a multi-chip module configuration. Memory coupled to controller 1645 may be any type of non-volatile memory such as NAND flash memory, NOR flash memory, nano RAM (NRAM), magneto-resistive RAM (MRAM), phase change RAM (PRAM), Racetrack memory, Memristor memory, etc. As noted above, this memory may store program instructions executable by compute complex 1620 to cause the computing device to perform functionality described herein.

Graphics unit 1675 may include one or more processors, e.g., one or more graphics processing units (GPUs). Graphics unit 1675 may receive graphics-oriented instructions, such as VULKAN®, Metal®, or DIRECTX® instructions, for example. Graphics unit 1675 may execute specialized GPU instructions or perform other operations based on the received graphics-oriented instructions. Graphics unit 1675 may generally be configured to process large blocks of data in parallel and may build images in a frame buffer for output to a display, which may be included in the device or may be a separate device. Graphics unit 1675 may include transform, lighting, triangle, and rendering engines in one or more graphics processing pipelines. Graphics unit 1675 may output pixel information for display images. Graphics unit 1675, in various embodiments, may include programmable shader circuitry which may include highly parallel execution cores configured to execute graphics programs, which may include pixel tasks, vertex tasks, and compute tasks (which may or may not be graphics-related).

Display unit 1665 may be configured to read data from a frame buffer and provide a stream of pixel values for display. Display unit 1665 may be configured as a display pipeline in some embodiments. Additionally, display unit 1665 may be configured to blend multiple frames to produce an output frame. Further, display unit 1665 may include one or more interfaces (e.g., MIPI® or embedded display port (eDP)) for coupling to a user display (e.g., a touchscreen or an external display).

I/O bridge 1650 may include various elements configured to implement: universal serial bus (USB) communications, security, audio, and low-power always-on functionality, for example. I/O bridge 1650 may also include interfaces such as pulse-width modulation (PWM), general-purpose input/output (GPIO), serial peripheral interface (SPI), and inter-integrated circuit (I2C), for example. Various types of peripherals and devices may be coupled to device 1600 via I/O bridge 1650.

In some embodiments, device 1600 includes network interface circuitry (not explicitly shown), which may be connected to fabric 1610 or I/O bridge 1650. The network interface circuitry may be configured to communicate via various networks, which may be wired, wireless, or both. For example, the network interface circuitry may be configured to communicate via a wired local area network, a wireless local area network (e.g., via Wi-Fi™), or a wide area network (e.g., the Internet or a virtual private network). In some embodiments, the network interface circuitry is configured to communicate via one or more cellular networks that use one or more radio access technologies. In some embodiments, the network interface circuitry is configured to communicate using device-to-device communications (e.g., Bluetooth® or Wi-Fi™ Direct), etc. In various embodiments, the network interface circuitry may provide device 1600 with connectivity to various types of other devices and networks.

Example Applications

Figure 17:
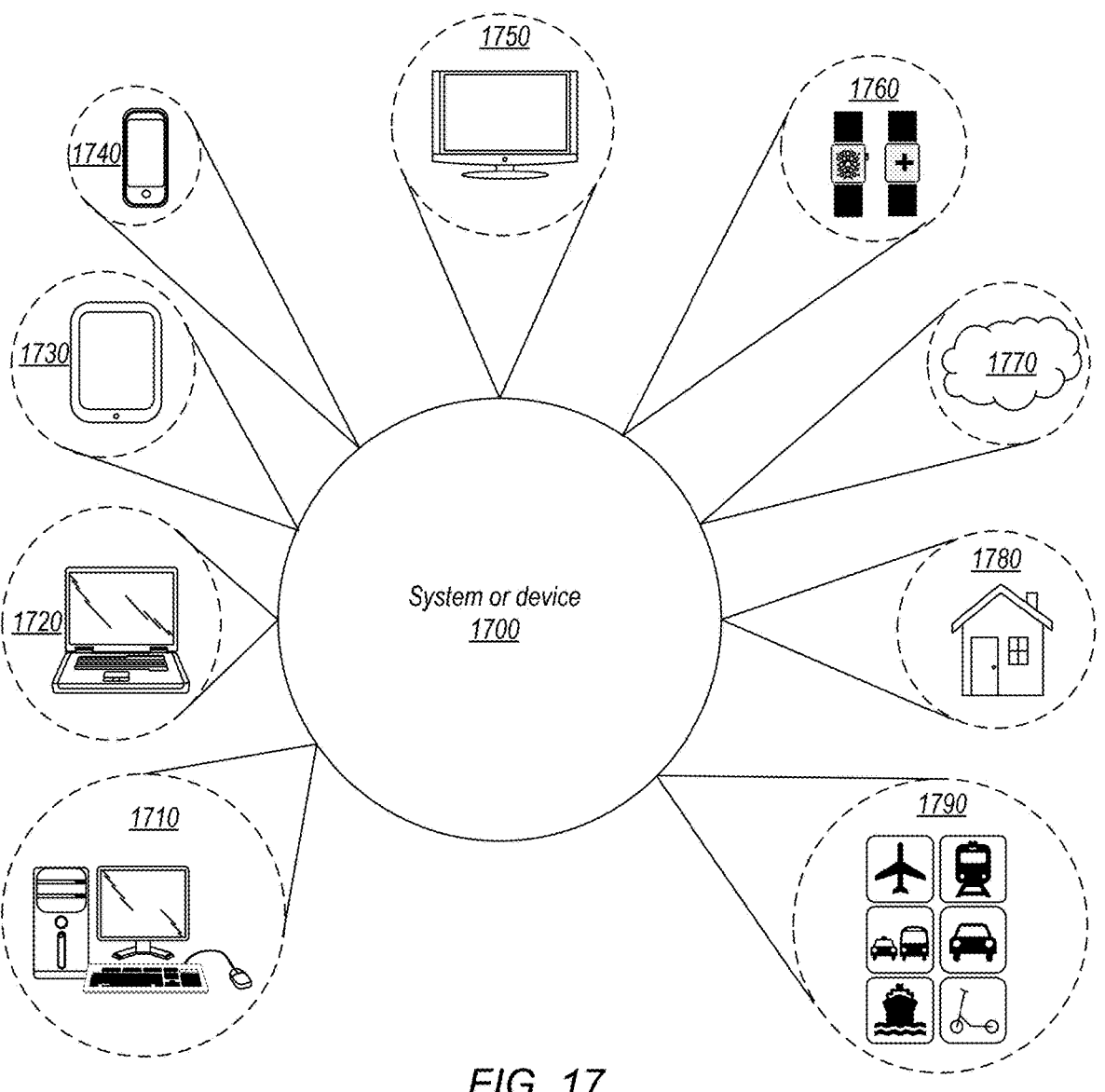
FIG. 17 is a diagram illustrating example applications of disclosed systems and devices, according to some embodiments.

Turning now to FIG. 17, various types of systems that may include any of the circuits, devices, or system discussed above. System or device 1700, which may incorporate or otherwise utilize one or more of the techniques described herein, may be utilized in a wide range of areas. For example, system or device 1700 may be utilized as part of the hardware of systems such as a desktop computer 1710, laptop computer 1720, tablet computer 1730, cellular or mobile phone 1740, or television 1750 (or set-top box coupled to a television).

Similarly, disclosed elements may be utilized in a wearable device 1760, such as a smartwatch or a health-monitoring device. Smartwatches, in many embodiments, may implement a variety of different functions—for example, access to email, cellular service, calendar, health monitoring, etc. A wearable device may also be designed solely to perform health-monitoring functions, such as monitoring a user's vital signs, performing epidemiological functions such as contact tracing, providing communication to an emergency medical service, etc. Other types of devices are also contemplated, including devices worn on the neck, devices implantable in the human body, glasses or a helmet designed to provide computer-generated reality experiences such as those based on augmented and/or virtual reality, etc.

System or device 1700 may also be used in various other contexts. For example, system or device 1700 may be utilized in the context of a server computer system, such as a dedicated server or on shared hardware that implements a cloud-based service 1770. Still further, system or device 1700 may be implemented in a wide range of specialized everyday devices, including devices 1780 commonly found in the home such as refrigerators, thermostats, security cameras, etc. The interconnection of such devices is often referred to as the "Internet of Things" (IoT). Elements may also be implemented in various modes of transportation. For example, system or device 1700 could be employed in the control systems, guidance systems, entertainment systems, etc. of various types of vehicles 1790.

The applications illustrated in FIG. 17 are merely exemplary and are not intended to limit the potential future applications of disclosed systems or devices. Other example applications include, without limitation: portable gaming devices, music players, data storage devices, unmanned aerial vehicles, etc.

Example Computer-Readable Medium

The present disclosure has described various example circuits in detail above. It is intended that the present disclosure cover not only embodiments that include such circuitry, but also a computer-readable storage medium that includes design information that specifies such circuitry. Accordingly, the present disclosure is intended to support claims that cover not only an apparatus that includes the disclosed circuitry, but also a storage medium that specifies the circuitry in a format that programs a computing system to generate a simulation model of the hardware circuit, programs a fabrication system configured to produce hardware (e.g., an integrated circuit) that includes the disclosed circuitry, etc. Claims to such a storage medium are intended to cover, for example, an entity that produces a circuit design, but does not itself perform complete operations such as: design simulation, design synthesis, circuit fabrication, etc.

Figure 18:
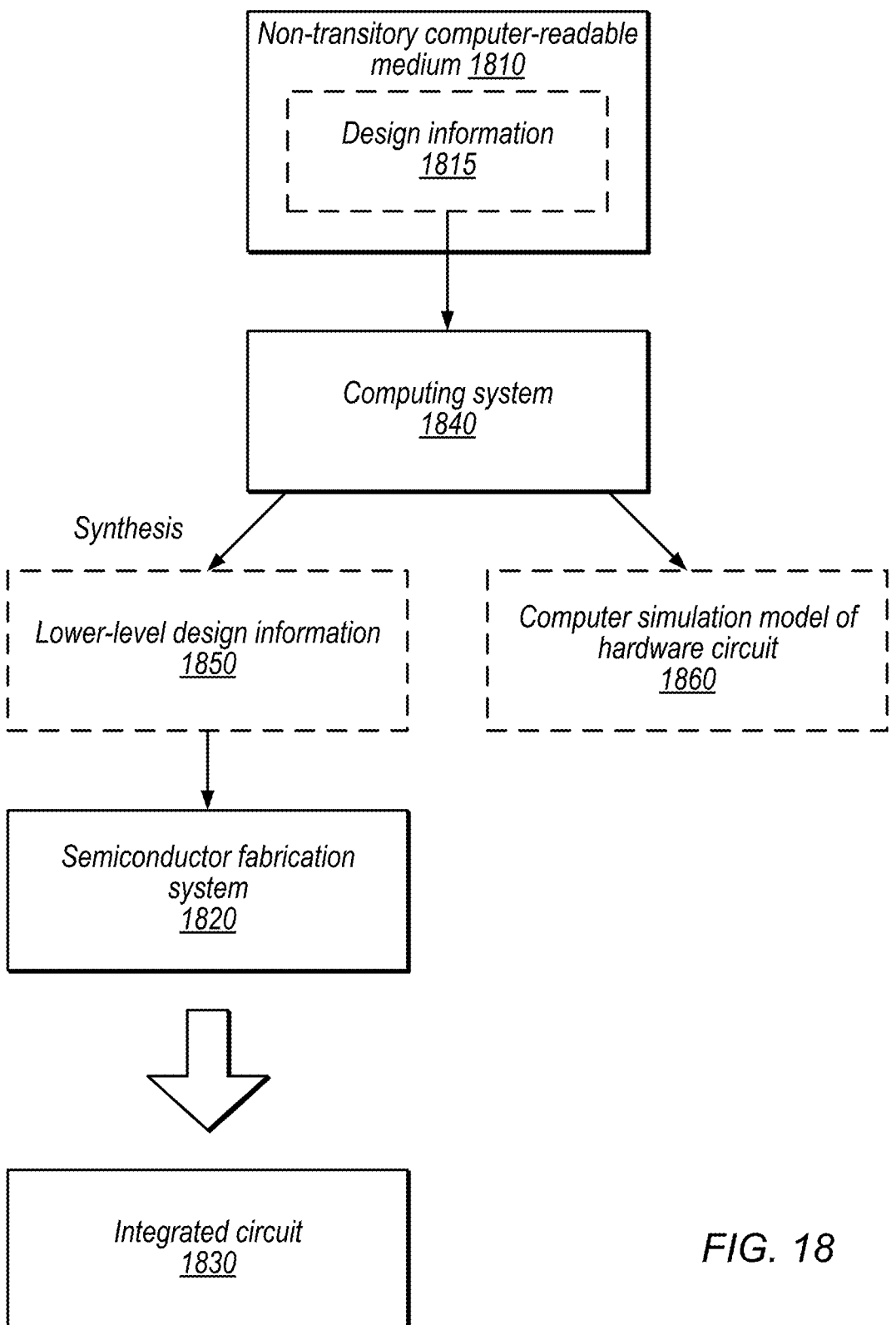
FIG. 18 is a block diagram illustrating an example computer-readable medium that stores circuit design information, according to some embodiments.

FIG. 18 is a block diagram illustrating an example non-transitory computer-readable storage medium that stores circuit design information, according to some embodiments. In the illustrated embodiment, computing system 1840 is configured to process the design information. This may include executing instructions included in the design information, interpreting instructions included in the design information, compiling, transforming, or otherwise updating the design information, etc. Therefore, the design information controls computing system 1840 (e.g., by programming computing system 1840) to perform various operations discussed below, in some embodiments.

In the illustrated example, computing system 1840 processes the design information to generate both a computer simulation model of a hardware circuit 1860 and lower-level design information 1850. In other embodiments, computing system 1840 may generate only one of these outputs, may generate other outputs based on the design information, or both. Regarding the computing simulation, computing system 1840 may execute instructions of a hardware description language that includes register transfer level (RTL) code, behavioral code, structural code, or some combination thereof. The simulation model may perform the functionality specified by the design information, facilitate verification of the functional correctness of the hardware design, generate power consumption estimates, generate timing estimates, etc.

In the illustrated example, computing system 1840 also processes the design information to generate lower-level design information 1850 (e.g., gate-level design information, a netlist, etc.). This may include synthesis operations, as shown, such as constructing a multi-level network, optimizing the network using technology-independent techniques, technology dependent techniques, or both, and outputting a network of gates (with potential constraints based on available gates in a technology library, sizing, delay, power, etc.). Based on lower-level design information 1850 (potentially among other inputs), semiconductor fabrication system 1820 is configured to fabricate an integrated circuit

1830 (which may correspond to functionality of the simulation model 1860). Note that computing system 1840 may generate different simulation models based on design information at various levels of description, including information 1850, 1815, and so on. The data representing design information 1850 and model 1860 may be stored on medium 1810 or on one or more other media.

In some embodiments, the lower-level design information 1850 controls (e.g., programs) the semiconductor fabrication system 1820 to fabricate the integrated circuit 1830. Thus, when processed by the fabrication system, the design information may program the fabrication system to fabricate a circuit that includes various circuitry disclosed herein.

Non-transitory computer-readable storage medium 1810, may comprise any of various appropriate types of memory devices or storage devices. Non-transitory computer-readable storage medium 1810 may be an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. Non-transitory computer-readable storage medium 1810 may include other types of non-transitory memory as well or combinations thereof. Accordingly, non-transitory computer-readable storage medium 1810 may include two or more memory media; such media may reside in different locations—for example, in different computer systems that are connected over a network.

Design information 1815 may be specified using any of various appropriate computer languages, including hardware description languages such as, without limitation: VHDL, Verilog, SystemC, SystemVerilog, RHDL, M, MyHDL, etc. The format of various design information may be recognized by one or more applications executed by computing system 1840, semiconductor fabrication system 1820, or both. In some embodiments, design information may also include one or more cell libraries that specify the synthesis, layout, or both of integrated circuit 1830. In some embodiments, the design information is specified in whole or in part in the form of a netlist that specifies cell library elements and their connectivity. Design information discussed herein, taken alone, may or may not include sufficient information for fabrication of a corresponding integrated circuit. For example, design information may specify the circuit elements to be fabricated but not their physical layout. In this case, design information may be combined with layout information to actually fabricate the specified circuitry.

Integrated circuit 1830 may, in various embodiments, include one or more custom macrocells, such as memories, analog or mixed-signal circuits, and the like. In such cases, design information may include information related to included macrocells. Such information may include, without limitation, schematics capture database, mask design data, behavioral models, and device or transistor level netlists. Mask design data may be formatted according to graphic data system (GDSII), or any other suitable format.

Semiconductor fabrication system 1820 may include any of various appropriate elements configured to fabricate integrated circuits. This may include, for example, elements for depositing semiconductor materials (e.g., on a wafer, which may include masking), removing materials, altering the shape of deposited materials, modifying materials (e.g., by doping materials or modifying dielectric constants using ultraviolet processing), etc. Semiconductor fabrication system 1820 may also be configured to perform various testing of fabricated circuits for correct operation.

In various embodiments, integrated circuit 1830 and model 1860 are configured to operate according to a circuit design specified by design information 1815, which may include performing any of the functionality described herein. For example, integrated circuit 1830 may include any of various elements shown in FIGS. 1B, 9, and 13. Further, integrated circuit 1830 may be configured to perform various functions described herein in conjunction with other components. Further, the functionality described herein may be performed by multiple connected integrated circuits.

As used herein, a phrase of the form "design information that specifies a design of a circuit configured to . . . " does not imply that the circuit in question must be fabricated in order for the element to be met. Rather, this phrase indicates that the design information describes a circuit that, upon being fabricated, will be configured to perform the indicated actions or will include the specified components. Similarly, stating "instructions of a hardware description programming language" that are "executable" to program a computing system to generate a computer simulation model" does not imply that the instructions must be executed in order for the element to be met, but rather specifies characteristics of the instructions. Additional features relating to the model (or the circuit represented by the model) may similarly relate to characteristics of the instructions, in this context. Therefore, an entity that sells a computer-readable medium with instructions that satisfy recited characteristics may provide an infringing product, even if another entity actually executes the instructions on the medium.

Note that a given design, at least in the digital logic context, may be implemented using a multitude of different gate arrangements, circuit technologies, etc. As one example, different designs may select or connect gates based on design tradeoffs (e.g., to focus on power consumption, performance, circuit area, etc.). Further, different manufacturers may have proprietary libraries, gate designs, physical gate implementations, etc. Different entities may also use different tools to process design information at various layers (e.g., from behavioral specifications to physical layout of gates).

Once a digital logic design is specified, however, those skilled in the art need not perform substantial experimentation or research to determine those implementations. Rather, those of skill in the art understand procedures to reliably and predictably produce one or more circuit implementations that provide the function described by the design information. The different circuit implementations may affect the performance, area, power consumption, etc. of a given design (potentially with tradeoffs between different design goals), but the logical function does not vary among the different circuit implementations of the same circuit design.

In some embodiments, the instructions included in the design information instructions provide RTL information (or other higher-level design information) and are executable by the computing system to synthesize a gate-level netlist that represents the hardware circuit based on the RTL information as an input. Similarly, the instructions may provide behavioral information and be executable by the computing system to synthesize a netlist or other lower-level design information. The lower-level design information may program fabrication system 1820 to fabricate integrated circuit 1830.

The various techniques described herein may be performed by one or more computer programs. The term "program" is to be construed broadly to cover a sequence of instructions in a programming language that a computing device can execute. These programs may be written in any suitable computer language, including lower-level languages such as assembly and higher-level languages such as Python. The program may be written in a compiled language such as C or C++, or an interpreted language such as JavaScript.

Program instructions may be stored on a "computer-readable storage medium" or a "computer-readable medium" in order to facilitate execution of the program instructions by a computer system. Generally speaking, these phrases include any tangible or non-transitory storage or memory medium. The terms "tangible" and "non-transitory" are intended to exclude propagating electromagnetic signals, but not to otherwise limit the type of storage medium. Accordingly, the phrases "computer-readable storage medium" or a "computer-readable medium" are intended to cover types of storage devices that do not necessarily store information permanently (e.g., random access memory (RAM)). The term "non-transitory," accordingly, is a limitation on the nature of the medium itself (i.e., the medium cannot be a signal) as opposed to a limitation on data storage persistency of the medium (e.g., RAM vs. ROM).

The phrases "computer-readable storage medium" and "computer-readable medium" are intended to refer to both a storage medium within a computer system as well as a removable medium such as a CD-ROM, memory stick, or portable hard drive. The phrases cover any type of volatile memory within a computer system including DRAM, DDR RAM, SRAM, EDO RAM, Rambus RAM, etc., as well as non-volatile memory such as magnetic media, e.g., a hard drive, or optical storage. The phrases are explicitly intended to cover the memory of a server that facilitates downloading of program instructions, the memories within any intermediate computer system involved in the download, as well as the memories of all destination computing devices. Still further, the phrases are intended to cover combinations of different types of memories.

In addition, a computer-readable medium or storage medium may be located in a first set of one or more computer systems in which the programs are executed, as well as in a second set of one or more computer systems which connect to the first set over a network. In the latter instance, the second set of computer systems may provide program instructions to the first set of computer systems for execution. In short, the phrases "computer-readable storage medium" and "computer-readable medium" may include two or more media that may reside in different locations, e.g., in different computers that are connected over a network.

The present disclosure includes references to an "embodiment" or groups of "embodiments" (e.g., "some embodiments" or "various embodiments"). Embodiments are different implementations or instances of the disclosed concepts. References to "an embodiment," "one embodiment," "a particular embodiment," and the like do not necessarily refer to the same embodiment. A large number of possible embodiments are contemplated, including those specifically disclosed, as well as modifications or alternatives that fall within the spirit or scope of the disclosure.

This disclosure may discuss potential advantages that may arise from the disclosed embodiments. Not all implementations of these embodiments will necessarily manifest any or all of the potential advantages. Whether an advantage is realized for a particular implementation depends on many factors, some of which are outside the scope of this disclosure. In fact, there are a number of reasons why an implementation that falls within the scope of the claims might not exhibit some or all of any disclosed advantages. For example, a particular implementation might include other circuitry outside the scope of the disclosure that, in conjunction with one of the disclosed embodiments, negates or diminishes one or more of the disclosed advantages. Furthermore, suboptimal design execution of a particular implementation (e.g., implementation techniques or tools) could also negate or diminish disclosed advantages. Even assuming a skilled implementation, realization of advantages may still depend upon other factors such as the environmental circumstances in which the implementation is deployed. For example, inputs supplied to a particular implementation may prevent one or more problems addressed in this disclosure from arising on a particular occasion, with the result that the benefit of its solution may not be realized. Given the existence of possible factors external to this disclosure, it is expressly intended that any potential advantages described herein are not to be construed as claim limitations that must be met to demonstrate infringement. Rather, identification of such potential advantages is intended to illustrate the type(s) of improvement available to designers having the benefit of this disclosure. That such advantages are described permissively (e.g., stating that a particular advantage "may arise") is not intended to convey doubt about whether such advantages can in fact be realized, but rather to recognize the technical reality that realization of such advantages often depends on additional factors.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application may be combined in any suitable manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims. Similarly, features from respective independent claims may be combined where appropriate.

Accordingly, while the appended dependent claims may be drafted such that each depends on a single other claim, additional dependencies are also contemplated. Any combinations of features in the dependent that are consistent with this disclosure are contemplated and may be claimed in this or another application. In short, combinations are not limited to those specifically enumerated in the appended claims.

Where appropriate, it is also contemplated that claims drafted in one format or statutory type (e.g., apparatus) are intended to support corresponding claims of another format or statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to a singular form of an item (i.e., a noun or noun phrase preceded by "a," "an," or "the") are, unless context clearly dictates otherwise, intended to mean "one or more." Reference to "an item" in a claim thus does not, without accompanying context, preclude additional instances of the item. A "plurality" of items refers to a set of two or more of the items.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," and thus covers 1) x but not y, 2) y but not x, and 3) both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set [w, x, y, z], thereby covering all possible combinations in this list of elements. This phrase is not to be interpreted to require that there is at least one instance of w, at least one instance of x, at least one instance of y, and at least one instance of z.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third" when applied to a feature do not imply any type of ordering (e.g., spatial, temporal, logical, etc.), unless stated otherwise.

The phrase "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors, or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C. This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to."

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical). More specifically, this formulation is used to indicate that this structure is arranged to perform the one or more tasks during operation. A structure can be said to be "configured to" perform some task even if the structure is not currently being operated. Thus, an entity described or recited as being "configured to" perform some task refers to something physical, such as a device, circuit, a system having a processor unit and a memory storing program instructions executable to implement the task, etc. This phrase is not used herein to refer to something intangible.

In some cases, various units/circuits/components may be described herein as performing a set of tasks or operations. It is understood that those entities are "configured to" perform those tasks/operations, even if not specifically noted.

The term "configured to" is not intended to mean "configurable to." An unprogrammed FPGA, for example, would not be considered to be "configured to" perform a particular function. This unprogrammed FPGA may be "configurable to" perform that function, however. After appropriate programming, the FPGA may then be said to be "configured to" perform the particular function.

For purposes of United States patent applications based on this disclosure, reciting in a claim that a structure is "configured to" perform one or more tasks is expressly intended not to invoke 35 U.S.C. § 112(f) for that claim element. Should Applicant wish to invoke Section 112(f) during prosecution of a United States patent application based on this disclosure, it will recite claim elements using the "means for" [performing a function] construct.

Different "circuits" may be described in this disclosure. These circuits or "circuitry" constitute hardware that includes various types of circuit elements, such as combinatorial logic, clocked storage devices (e.g., flip-flops, registers, latches, etc.), finite state machines, memory (e.g., random-access memory, embedded dynamic random-access memory), programmable logic arrays, and so on. Circuitry may be custom designed, or taken from standard libraries. In various implementations, circuitry can, as appropriate, include digital components, analog components, or a combination of both. Certain types of circuits may be commonly referred to as "units" (e.g., a decode unit, an arithmetic logic unit (ALU), functional unit, memory management unit (MMU), etc.). Such units also refer to circuits or circuitry.

The disclosed circuits/units/components and other elements illustrated in the drawings and described herein thus include hardware elements such as those described in the preceding paragraph. In many instances, the internal arrangement of hardware elements within a particular circuit may be specified by describing the function of that circuit.

For example, a particular "decode unit" may be described as performing the function of "processing an opcode of an instruction and routing that instruction to one or more of a plurality of functional units," which means that the decode unit is "configured to" perform this function. This specification of function is sufficient, to those skilled in the computer arts, to connote a set of possible structures for the circuit.

In various embodiments, as discussed in the preceding paragraph, circuits, units, and other elements may be defined by the functions or operations that they are configured to implement. The arrangement of such circuits/units/components with respect to each other and the manner in which they interact form a microarchitectural definition of the hardware that is ultimately manufactured in an integrated circuit or programmed into an FPGA to form a physical implementation of the microarchitectural definition. Thus, the microarchitectural definition is recognized by those of skill in the art as structure from which many physical implementations may be derived, all of which fall into the broader structure described by the microarchitectural definition. That is, a skilled artisan presented with the microarchitectural definition supplied in accordance with this disclosure may, without undue experimentation and with the application of ordinary skill, implement the structure by coding the description of the circuits/units/components in a hardware description language (HDL) such as Verilog or VHDL. The HDL description is often expressed in a fashion that may appear to be functional. But to those of skill in the art in this field, this HDL description is the manner that is used to transform the structure of a circuit, unit, or component to the next level of implementational detail. Such an HDL description may take the form of behavioral code (which is typically not synthesizable), register transfer language (RTL) code (which, in contrast to behavioral code, is typically synthesizable), or structural code (e.g., a netlist specifying logic gates and their connectivity). The HDL description may subsequently be synthesized against a library of cells designed for a given integrated circuit fabrication technology, and may be modified for timing, power, and other reasons to result in a final design database that is transmitted to a foundry to generate masks and ultimately produce the integrated circuit. Some hardware circuits or portions thereof may also be custom-designed in a schematic editor and captured into the integrated circuit design along with synthesized circuitry. The integrated circuits may include transistors and other circuit elements (e.g., passive elements such as capacitors, resistors, inductors, etc.) and interconnect between the transistors and circuit elements. Some embodiments may implement multiple integrated circuits coupled together to implement the hardware circuits, and/or discrete elements may be used in some embodiments. Alternatively, the HDL design may be synthesized to a programmable logic array such as a field programmable gate array (FPGA) and may be implemented in the FPGA. This decoupling between the design of a group of circuits and the subsequent low-level implementation of these circuits commonly results in the scenario in which the circuit or logic designer never specifies a particular set of structures for the low-level implementation beyond a description of what the circuit is configured to do, as this process is performed at a different stage of the circuit implementation process.

The fact that many different low-level combinations of circuit elements may be used to implement the same specification of a circuit results in a large number of equivalent structures for that circuit. As noted, these low-level circuit implementations may vary according to changes in the fabrication technology, the foundry selected to manufacture the integrated circuit, the library of cells provided for a particular project, etc. In many cases, the choices made by different design tools or methodologies to produce these different implementations may be arbitrary.

Moreover, it is common for a single implementation of a particular functional specification of a circuit to include, for a given embodiment, a large number of devices (e.g., millions of transistors). Accordingly, the sheer volume of this information makes it impractical to provide a full recitation of the low-level structure used to implement a single embodiment, let alone the vast array of equivalent possible implementations. For this reason, the present disclosure describes structure of circuits using the functional shorthand commonly employed in the industry.

The invention claimed is:

1. An apparatus, comprising:
a graphics processor that includes circuitry configured to:
  generate a bounding volume hierarchy (BVH) data structure for a graphics scene to be rendered, wherein the BVH includes a leaf node that includes:
    node data that specifies quantization frame data for quantized primitive children of the leaf node;
    a quantized primitive block that includes quantized vertex components of the primitive children; and
    a vertex residual block that includes additional vertex data for the primitive children, wherein the vertex residual block does not include redundant data with the quantized primitive block and wherein the quantized primitive block and vertex residual block include, for the primitive children, sufficient data to reconstruct an original-precision representation of their vertices; and
  traverse the BVH to perform ray tracing operations during render of the graphics scene, including to perform one or more ray primitive intersect tests based on the quantized primitive block and the vertex residual block.

2. The apparatus of claim 1, wherein the circuitry includes:
triangle filter circuitry configured to perform a quantized ray primitive intersect test based on the quantized primitive block; and
triangle intersect test circuitry configured to perform an original-precision ray primitive intersect test based on decode of the quantized primitive block and the vertex residual block.

3. The apparatus of claim 1, wherein the circuitry includes:
shader processor circuitry configured to generate the BVH data structure; and
ray intersect accelerator circuitry configured to traverse the BVH.

4. The apparatus of claim 1, wherein the leaf node further includes a primitive metadata block that includes identifier information for the primitive children.

5. The apparatus of claim 4, wherein the primitive metadata block has a size that is smaller than or equal to a size of cache lines of a data cache included in the graphics processor.

6. The apparatus of claim 1, wherein the quantized primitive block has a size that is smaller than or equal to a size of cache lines of a data cache included in the graphics processor.

7. The apparatus of claim 1, wherein the vertex residual block includes one or more data chunks that each have a size that is smaller than or equal to a size of cache lines of a data cache included in the graphics processor.

8. The apparatus of claim 1, wherein the node data specifies quantization frame scale factors for multiple axes, a quantization frame origin, a number of primitive children of the node, and a number of quantized primitive blocks for the node.

9. The apparatus of claim 1, wherein the quantized primitive block encodes:

a bit count per component;

an array of quantized data for unique vertices; and per-primitive indices into the array of quantized data.

10. The apparatus of claim 9, wherein the vertex residual block encodes:

a count of stored bits of precision for multiple axes; and residual bits of vertex data that was not representable using the bit count per component encoded by the quantized primitive block.

11. The apparatus of claim 9, wherein the leaf node further includes a primitive metadata block that encodes:

a header that indicates a number of geometry identifiers and a number of primitive identifier upper bits;

per-primitive indices into an array of geometry identifiers;

a set of shared upper primitive identifier bits; and per-primitive sets of lower primitive identifier bits.

12. The apparatus of claim 1, wherein the graphics processor is further configured to:

generate, for a node of the BVH, an array of unique vertices of primitive children of the node;

for vertices of a proper subset of primitive children of the node, look up the array to determine a set of indices in the array for the proper subset;

perform the look up and determination for multiple different proper subsets of primitive children of the node;

select an assignment of primitive children to quantized primitive blocks based on the sets of indices corresponding to the multiple different proper subsets; and generate the quantized primitive block for the selected assignment of primitive children, according to the selected assignment, wherein the quantized primitive block utilizes a fixed number of bits per quantized vertex component.

13. A method, comprising:

generating, by a computing system, a bounding volume hierarchy (BVH) data structure for a graphics scene to be rendered, wherein the BVH includes a leaf node that includes:

node data that specifies quantization frame data for quantized primitive children of the leaf node;

a quantized primitive block that includes quantized vertex components of the primitive children; and a vertex residual block that includes additional vertex data for the primitive children, wherein the vertex residual block does not include redundant data with the quantized primitive block and wherein the quantized primitive block and vertex residual block include, for the primitive children, sufficient data to reconstruct an original-precision representation of their vertices; and traversing, by the computing system, the BVH to perform ray tracing operations during render of the graphics scene, including to perform one or more ray primitive intersect tests based on the quantized primitive block and the vertex residual block.

14. The method of claim 13, wherein the quantized primitive block encodes:

a bit count per component;

an array of quantized data for unique vertices; and per-primitive indices into the array of quantized data.

15. The method of claim 14, wherein the vertex residual block encodes:

a count of stored bits of precision for multiple axes; and residual bits of vertex data that was not representable using the bit count per component encoded by the quantized primitive block.

16. The method of claim 14, further comprising:

generating, by the computing system for a node of the BVH, an array of unique vertices of primitive children of the node;

for vertices of a proper subset of primitive children of the node, the computing system looking up the array to determine a set of indices in the array for the proper subset;

performing the look up and determination for multiple different proper subsets of primitive children of the node;

selecting, by the computing system, an assignment of primitive children to quantized primitive blocks based on the sets of indices corresponding to the multiple different proper subsets; and generating, by the computing system, the quantized primitive block for the selected assignment of primitive children, according to the selected assignment, wherein the quantized primitive block utilizes a fixed number of bits per quantized vertex component.

17. A non-transitory computer-readable medium having instructions stored thereon that are executable by a computing device to perform operations comprising:

generating a bounding volume hierarchy (BVH) data structure for a graphics scene to be rendered, wherein the BVH includes a leaf node that includes:

node data that specifies quantization frame data for quantized primitive children of the leaf node;

a quantized primitive block that includes quantized vertex components of the primitive children; and a vertex residual block that includes additional vertex data for the primitive children, wherein the vertex residual block does not include redundant data with the quantized primitive block and wherein the quantized primitive block and vertex residual block include, for the primitive children, sufficient data to reconstruct an original-precision representation of their vertices.

18. The non-transitory computer-readable medium of claim 17, wherein the leaf node further includes a primitive metadata block that includes identifier information for the primitive children.

19. The non-transitory computer-readable medium of claim 17, wherein the quantized primitive block has a size that is smaller than or equal to a size of cache lines of a data cache of the computing device.

20. The non-transitory computer-readable medium of claim 17, wherein the operations further comprise:

generating, for a node of the BVH, an array of unique vertices of primitive children of the node;

for vertices of a proper subset of primitive children of the node, looking up the array to determine a set of indices in the array for the proper subset;

performing the look up and determination for multiple different proper subsets of primitive children of the node;

selecting an assignment of primitive children to quantized primitive blocks based on the sets of indices corresponding to the multiple different proper subsets; and generating the quantized primitive block for the selected assignment of primitive children, according to the selected assignment, wherein the quantized primitive block utilizes a fixed number of bits per quantized vertex component.

* * * * *